United States Patent
Wu et al.

(10) Patent No.: US 12,547,824 B2
(45) Date of Patent: Feb. 10, 2026

(54) USER INTERFACE DATA ANALYZER HIGHLIGHTER

(71) Applicant: Business Objects Software Ltd., Dublin (IE)

(72) Inventors: Ying Wu, Maynooth (IE); Malte Christian Kaufmann, Dublin (IE)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 200 days.

(21) Appl. No.: 18/348,172

(22) Filed: Jul. 6, 2023

(65) Prior Publication Data

US 2025/0013819 A1    Jan. 9, 2025

(51) Int. Cl.
*G06F 40/18* (2020.01)
*G06F 3/0482* (2013.01)

(52) U.S. Cl.
CPC ............ *G06F 40/18* (2020.01); *G06F 3/0482* (2013.01)

(58) Field of Classification Search
CPC ....... G06F 40/18; G06F 40/177; G06F 3/0482
See application file for complete search history.

(56) References Cited

U.S. PATENT DOCUMENTS

| | | | |
|---|---|---|---|
| 9,311,289 B1 * | 4/2016 | Kaptur | G06F 40/18 |
| 9,904,456 B2 * | 2/2018 | Xie | G06F 3/04883 |
| 2002/0161799 A1 * | 10/2002 | Maguire, III | G06F 40/18 715/212 |
| 2006/0047617 A1 * | 3/2006 | Bacioiu | G06N 3/08 717/124 |
| 2006/0074866 A1 * | 4/2006 | Chamberlain | G06F 40/18 |
| 2006/0129914 A1 * | 6/2006 | Ellis | G06F 3/04847 715/275 |
| 2007/0050700 A1 * | 3/2007 | Simkhay | G06F 40/18 715/220 |
| 2007/0101252 A1 * | 5/2007 | Chamberlain | G06F 40/18 715/220 |
| 2007/0174760 A1 * | 7/2007 | Chamberlain | G06F 40/103 707/999.102 |
| 2007/0204212 A1 * | 8/2007 | Chamberlain | G06F 40/103 715/212 |
| 2011/0099465 A1 * | 4/2011 | Haberl | G06F 40/18 715/217 |
| 2013/0091412 A1 * | 4/2013 | van den Broek | G06T 11/206 715/227 |

(Continued)

*Primary Examiner* — Patrick F Riegler
(74) *Attorney, Agent, or Firm* — Fountainhead Law Group, PC

(57) ABSTRACT

A data analyzer highlighter highlights elements of a user interface to enable a user to better understand and analyze the data presented. To do this, a first visualization is generated in a user interface. A configuration panel including elements for selecting statistical techniques is also generated in the user interface. Selections are obtained via the user interface of one or more statistical techniques. Then statistics are determined from the dataset using each of the one or more selected statistical techniques. Rows of data or the columns of data are then sorted based on a number of extreme values in the particular row or column, wherein the extreme value is a minimum value, a maximum value, or an outlier value. A second visualization sorted based on the number of extreme values in the particular row or column is then generated in the user interface.

15 Claims, 30 Drawing Sheets

(56) References Cited

U.S. PATENT DOCUMENTS

| | | | | |
|---|---|---|---|---|
| 2013/0346844 | A1* | 12/2013 | Graepel | G06F 40/18 |
| | | | | 715/219 |
| 2014/0173401 | A1* | 6/2014 | Oshlag | G06F 40/18 |
| | | | | 715/212 |
| 2014/0325329 | A1* | 10/2014 | Hao | G06F 40/18 |
| | | | | 715/215 |
| 2015/0033131 | A1* | 1/2015 | Peev | G06F 3/0482 |
| | | | | 715/731 |
| 2015/0278213 | A1* | 10/2015 | Anand | G06F 16/24578 |
| | | | | 707/723 |
| 2017/0185668 | A1* | 6/2017 | Convertino | G06F 40/18 |
| 2017/0235446 | A1* | 8/2017 | Stolte | G06F 16/252 |
| | | | | 715/854 |
| 2017/0337238 | A1* | 11/2017 | Zorn | G06F 40/18 |
| 2019/0251158 | A1* | 8/2019 | Toronto | G06F 40/18 |
| 2020/0210642 | A1* | 7/2020 | Bardoliwalla | G06F 40/157 |
| 2020/0410048 | A1* | 12/2020 | Waller | G06F 40/177 |
| 2021/0150489 | A1* | 5/2021 | Haramati | G06F 16/252 |
| 2021/0157978 | A1* | 5/2021 | Haramati | G06F 40/177 |
| 2021/0303781 | A1* | 9/2021 | Lereya | G06F 40/197 |
| 2021/0342361 | A1* | 11/2021 | Radzewsky | G06F 16/23 |
| 2021/0342785 | A1* | 11/2021 | Mann | G06F 40/186 |
| 2022/0284182 | A1* | 9/2022 | Lee | G06F 16/254 |
| 2023/0325587 | A1* | 10/2023 | Sarkar | G06F 16/287 |
| 2023/0351104 | A1* | 11/2023 | Dvorak | G06F 40/18 |
| 2024/0184979 | A1* | 6/2024 | Singh | G06F 16/355 |
| 2024/0320538 | A1* | 9/2024 | Narayanam | G06N 20/00 |

* cited by examiner

| PRICEEACH_mean | SALES_sum | SALES_max | SALES_mean | MSRP_mean | DEALSIZE_Large |
|---|---|---|---|---|---|
| 80.996098 | 135042.940000 | 6284.000000 | 3203.730244 | 96.585366 | 1.000000 |
| 78.181042 | 137955.720000 | 5279.400000 | 2874.077500 | 85.750000 | |
| 83.269231 | 74634.850000 | 5795.540000 | 2870.571154 | 86.230769 | |
| 80.977500 | 33440.100000 | 6275.720000 | 4180.012500 | 115.125000 | 4.000000 |
| 86.481750 | 149798.630000 | 8240.000000 | 3744.965750 | 102.925000 | 3.000000 |
| 83.363902 | 142874.250000 | 6602.920000 | 3484.737805 | 102.024390 | 1.000000 |
| 84.825526 | 134259.330000 | 7136.190000 | 3533.140263 | 99.184211 | 1.000000 |
| | 50218.510000 | 8448.640000 | 3347.900667 | 90.933333 | |
| 80.441724 | 82751.080000 | 6401.220000 | 2853.485517 | 96.724138 | |
| 82.831087 | 151570.960000 | 7956.460000 | 3295.021304 | 93.086957 | 1.000000 |
| 84.082308 | 88804.500000 | 6027.750000 | 3415.557692 | 96.038462 | |
| 85.551000 | 113961.150000 | 10606.200000 | 3798.705000 | 109.650000 | 1.000000 |
| | 79472.070000 | 8887.700000 | | | 2.000000 |
| 86.897353 | 120783.070000 | 7374.100000 | 3552.443235 | 102.294118 | 1.000000 |

| | CUSTOMERNAME | ORDERNUMBER_count | QUANTITYORDERED_sum | PRICEEACH_mean | SALES_sum | SALES_max | SALES_mean | MSRP_mean |
|---|---|---|---|---|---|---|---|---|
| 0 | AV Stores, Co. | 51 | 1778 | 77.847647 | 157807.810000 | 7210.000000 | 3094.270784 | 92.843137 |
| 1 | Alpha Cognac | 20 | 687 | 86.097500 | 70488.440000 | 8331.810000 | 3524.422000 | 97.150000 |
| 2 | Amica Models & Co. | 26 | 883 | 85.323462 | 94117.260000 | 8411.580000 | 3619.894615 | 97.653846 |
| 3 | Anna's Decorations, Ltd | 46 | 1469 | 83.858645 | 153996.130000 | 8470.140000 | 3347.744957 | 94.717391 |
| 4 | Atelier graphique | 7 | 273 | 78.775714 | 24179.960000 | 8331.860000 | 3454.280000 | 98.571429 |
| 5 | Australian Collectables, Ltd | 23 | 705 | 78.883043 | 64591.460000 | 8427.030000 | 2808.324348 | 88.130435 |

USER INTERFACE DATA ANALYZER HIGHLIGHTER

BACKGROUND

The present disclosure pertains to presentation of data and in particular to highlighting of datapoints in a set of data being presented in a user interface.

In certain data analytics software applications, the end user may access data as demanded, visualize the data, find interesting or special information, identify outliers, obtain predictive analytics, and make planning decisions. Data analytics software applications may generally follow the routine of data loading, data processing, data analysis, data visualization and reporting. In data analytics software, some tasks may be complicated and may require advanced functionality to support. However, whichever complicated task the end user takes, the first step in analytics may be to understand the data by data exploration. It is crucial to understand the data in data analytics because complicated analytics tasks may be associated with specific scenarios and choosing the most suitable analytics techniques for the complicated tasks may depend on having a good understanding of the data.

There is a need for improved software features and techniques for presenting analytical data in a user interface such that it improves the user's understanding of the data. The present disclosure addresses these issue and others, as further described below.

BRIEF DESCRIPTION OF THE DRAWINGS

FIG. 8 shows a diagram of the data analyzer highlighter highlighting column values by deviation from average, according to an embodiment.

FIG. 9 shows a diagram of the data analyzer highlighter highlighting values of records by deviation from average, according to an embodiment.

FIG. 10 shows a diagram of the data analyzer highlighter highlighting extreme column values, according to an embodiment.

FIG. 11 shows a diagram of the data analyzer highlighter highlighting extreme values of records, according to an embodiment.

FIG. 12 shows a diagram of the data analyzer highlighter highlighting outliers of column values, according to an embodiment.

FIG. 13 shows a diagram of the data analyzer highlighter highlighting outliers of values in records, according to an embodiment.

FIG. 14 shows a diagram of the data analyzer highlighter highlighting and reordering outliers of time series records, according to an embodiment.

Figure 15:
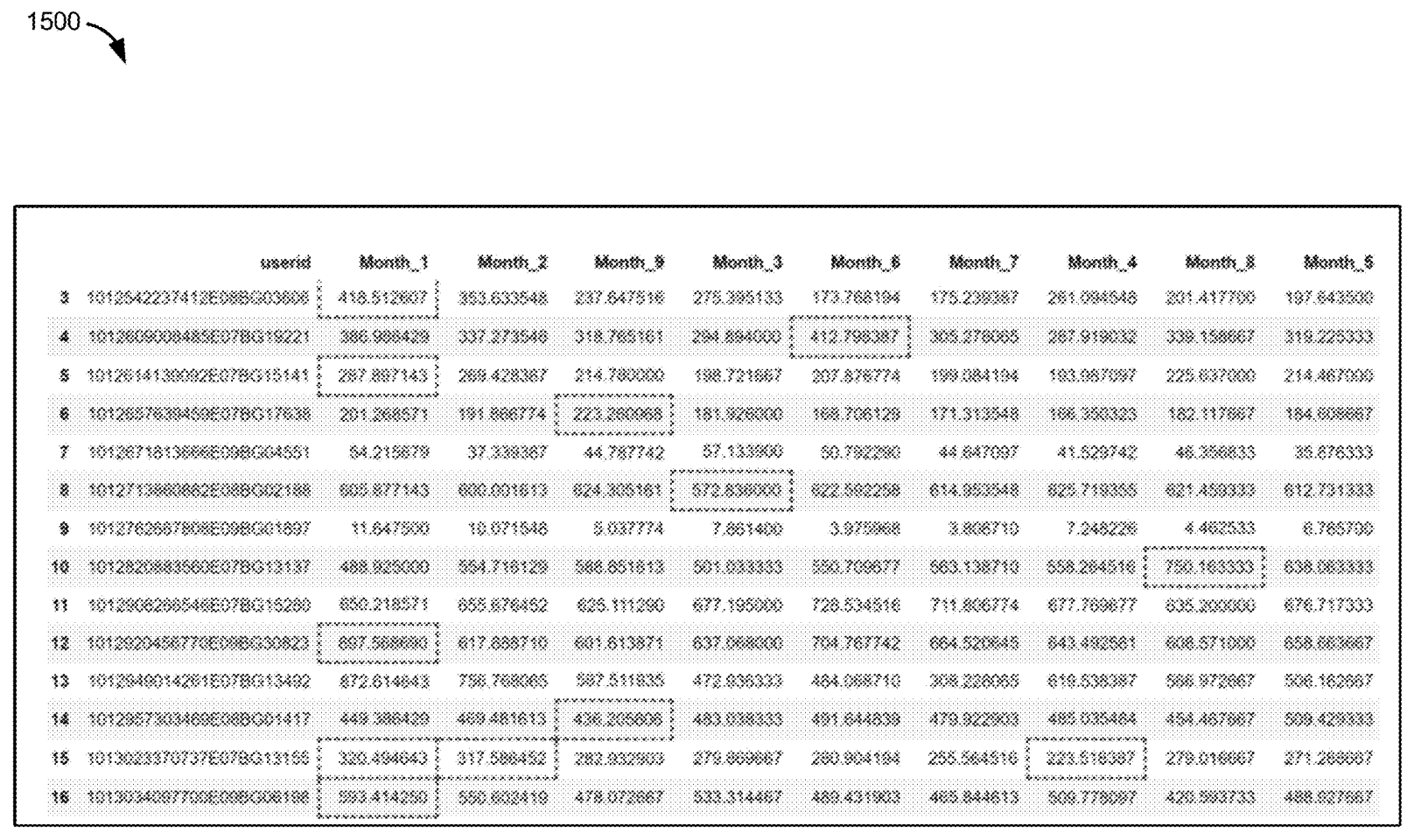

FIG. 15 shows a diagram of the data analyzer highlighter highlighting outliers of time series records and reordering, according to an embodiment.

FIG. 16 shows a diagram of the data analyzer highlighter highlighting anomalous records, according to an embodiment.

FIG. 17 shows a diagram of the data analyzer highlighter sorting table columns by variance, according to an embodiment.

FIG. 18 shows a diagram of the data analyzer highlighter sorting columns by kurtosis, according to an embodiment.

FIG. 19 shows a diagram of the data analyzer highlighter sorting columns by amount of information, according to an embodiment.

FIG. 20 shows a diagram of the data analyzer highlighter highlighting correlated table columns, according to an embodiment.

FIG. 21 shows a diagram of the data analyzer highlighter highlighting similar records, according to an embodiment.

FIG. 22 shows a diagram of the data analyzer highlighter highlighting columns by values, according to an embodiment.

FIG. 23 shows a diagram of the data analyzer highlighter highlighting column values by deviation from average, according to an embodiment.

FIG. 25 shows a diagram of the data analyzer highlighter highlighting correlated columns, according to an embodiment.

FIG. 26 shows a diagram of the data analyzer highlighter combining highlighting options, according to an embodiment.

FIG. 28 shows a diagram of the data analyzer highlighter highlighting outliers in time series data, according to an embodiment.

FIG. 29 shows a diagram of the data analyzer highlighter highlighting combining highlighter options for time series data, according to an embodiment.

DETAILED DESCRIPTION

Figure 1:
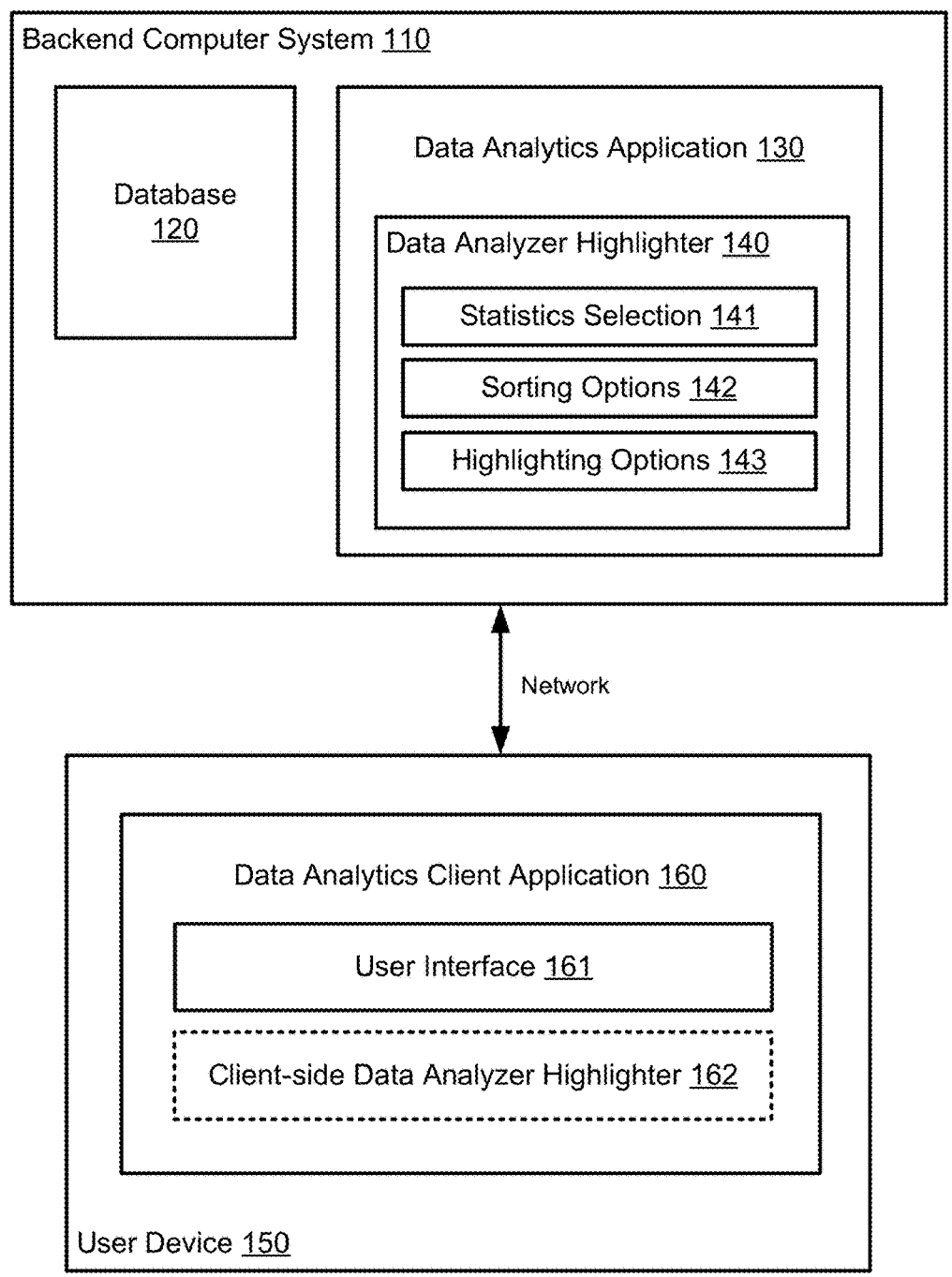
FIG. 1 shows a diagram of functions of a data analyzer highlighter tool, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," etc., do not necessarily indicate an ordering or sequence unless indicated. These terms, as used herein, may simply be used for differentiation between different objects or elements.

The drawings and figures are provided in grayscale. However, the techniques described herein may be used to produce computer user interfaces and visualizations in color. While color may be useful to an end user, the grayscale drawings and figures and their corresponding description are intended to convey the idea of using color in the computer user interfaces and visualizations created using the techniques disclosed herein.

As mentioned above, in certain data analytics software applications, the end user may access data as demanded, visualize the data, find interesting or special information, identify outliers, obtain predictive analytics, and make planning decisions. Data analytics software applications may generally follow the routine of data loading, data processing, data analysis, data visualization and reporting. In data analytics software, some tasks may be complicated and may require advanced functionality to support. However, whichever complicated task the end user takes, the first step in analytics may be to understand the data by data exploration. It is crucial to understand the data in data analytics because complicated analytics tasks may be associated with specific scenarios and choosing the most suitable analytics techniques for the complicated tasks may depend on having a good understanding of the data.

Accordingly, there is a need for improved software features and techniques for presenting analytical data in a user interface such that it improves the user's understanding of the data. The present disclosure addresses these issue and others, as further described below.

As just mentioned, the first step in analytics may be to understand the data by data exploration. For example, some typical data exploration tasks to understand the data including viewing the data to clarify features included in the data and their data types, viewing the data to clarify the size of data, checking the quality of data, including null values, special values, extreme values and duplicated values, understanding the minimal, maximal average and median values in numeric type columns, understanding the distribution of data with continuous values (e.g., the data could be distributed closely to its average with low variance or spread far from its average with high variance), identifying the interesting records representing special behaviors (e.g., some records may have feature values that are positively higher than the column average values), identifying the features that can bring more information, identifying the features that are closely correlated to the most interested features or the most informative features, and given some interested records, identifying other records with similar behavior.

Therefore, before performing any further analytics tasks, the end user may seek to understand their data. By observing and understanding the data, the end user may start to have their own questions, where they can set up the further data analytics tasks and start to use more advanced functionality in the data analytics software application to find out the answers.

In data analytics software, the end user may build a data table as demanded where the data columns can be selected, or new data columns can be created. Therefore, with the specified data source, or after making a chart on this data source, the end users can see deeper by accessing the underlying data, instead of sending the data, or making many other charts. However, apart from the data shown in the user interface, there is more information about the data that can be provided to the end user as described above. Such information may help the end user understand their data, identify the interesting points, and set up further data analytics tasks.

FIG. 1 shows a diagram 100 of functionality of a data analyzer highlighter tool 140, according to an embodiment. The data analyzer highlighter 140 may be provided by a data analytics application 130 operating on a backend computer system 110, for example. The backend computer system 110 may include one or more computer servers operating together, for example. The backend computer system 110 may be a cloud platform in some embodiments.

The data for the data analytics application 130 may be stored in a database 120 of the backend computer system 110. As further described below, the data analyzer highlighter 140 may provide for statistics selection 141 and sorting options 142 along with selection of highlighting options 143. With these features, the data analyzer highlighter tool 140 may enable an end user to understand data efficiently. Specifically, statistical techniques can be used to extract information from the data presented in the user interface of the data analytics software. The extracted statistical information may help the end user to form an overview of the original data quickly. The extracted statistical information is provided to the end user by "highlighting" the data. That is, smartly visualizing over the existing data table presented in the user interface of the data analytics software application. By using the Data Analyzer Highlighter 140, the end user can view their data in a data table with the additional statistical information at the same time. This may help the end user to obtain a good understanding about the data points, features and records, based on which further analytics tasks can be set up efficiently and easily.

The end user may be a user of a user device 150, for example. The user device 150 may be a computer system or other computer device that is configured to run a data analytics client application 160, which is configured to communicate with the data analytics application 130 of the backend computer system 110 over a network. The data analytics client application 160 includes a user interface 161 configured to present charts, tables, and other visualizations of data. In some embodiments, the data analytics application and data stored may be implemented by the user device 150 instead of being implemented on a backend computer system. In some embodiments the data analytics client application 160 may include a client-side data analyzer highlighter 162 instead of the data analyzer highlighter 140 implemented by the data analytics application 130 of the backend computer system 110.

The Data Analyzer Highlighter 140 disclosed herein provides several features and advantages. For instance, the data analyzer highlighter can provide statistics selection 141 and bring statistical information of the data to the end user in a user-friendly way (e.g., providing a panel with drop down menus and various selection and configuration options). The data analyzer highlighter can also provide sorting options 142 for sorting columns or rows of a table presenting the data, for example. From these techniques, the end user can take such information into account when viewing the data in the user interface 161 of the data analytics client application 160 to decide further analytics scenarios and set up further complicated analytics tasks. Another advantage is that the Data Analyzer Highlighter can provide flexible choices to allow the end users to acquire their demanded information. This may be done though selecting highlight options 143, statistics selection 141, and sorting options 142, which are further described in detail below. Another advantage is that information may be extracted based on statistical approaches with high performance. Another advantage is that the Data Analyzer Highlighter supports time-series data. Another advantage is that the Data Analyzer Highlighter may be implemented using a lightweight architecture, where the highlighter tool can be performed in the frontend of the GUI without communicating to the backend, such as using the client-side data analyzer highlighter 162.

The data analyzer highlighter and its various options and configurations are described in further detail below.

Figure 2:
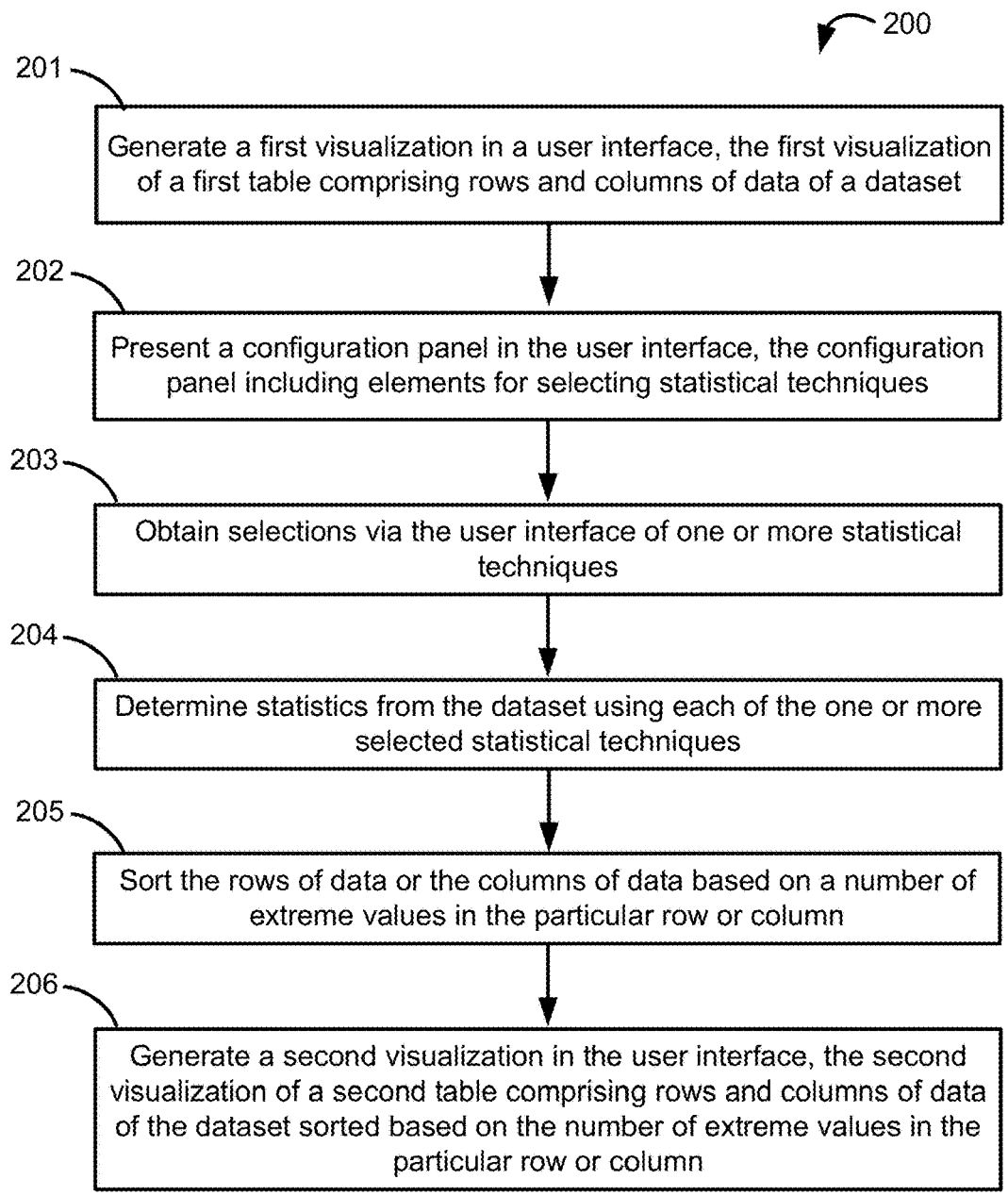
FIG. 2 shows a flowchart of a method, according to an embodiment.

FIG. 2 shows a flowchart 200 of a method, according to an embodiment. The method may be implemented by the data analytics application 130 or the data analytics client application 160 of FIG. 1, for example.

At 201, generate a first visualization in a user interface, the first visualization of a first table comprising rows and columns of data of a dataset. In some embodiments the dataset comprises time series data.

At 202, generate a configuration panel in the user interface, the configuration panel including elements for selecting statistical techniques. In some embodiments, the configuration panel includes elements for selecting sorting options including sorting by variance, sorting by distribution, or sorting by information.

At 203, obtain selections via the user interface of one or more statistical techniques. In some embodiments, the one or more statistical techniques include one or more of a probability, a distance to average, a distance to median, a minimal value within a column, a maximal value within a column, an interquartile range, a median absolute deviation, and an outlier within a row.

At 204, determine statistics from the dataset using each of the one or more selected statistical techniques. In embodiments where the dataset comprises time series data, the determining of statistics from the dataset may include determining statistics between the columns of data. In some embodiments, the determination of statistics from the dataset includes determining anomalous values in the time series data.

At 205, sort the rows of data or the columns of data based on a number of extreme values in the particular row or column, wherein the extreme value is a minimum value, a maximum value, or an outlier value; and At 206, generate a second visualization in the user interface, the second visualization of a second table comprising rows and columns of data of the dataset sorted based on the number of extreme values in the particular row or column. In some embodiments, the cells of the second table are highlighted in colors based on the probability of the cell value given all values in the corresponding column of the second table. In some embodiments the determined anomalous values mentioned above are identified by highlighting in the second visualization of the second table.

In some embodiments the method may generate bars within cells of the table corresponding to the values presents within the particular cell.

Figure 3:
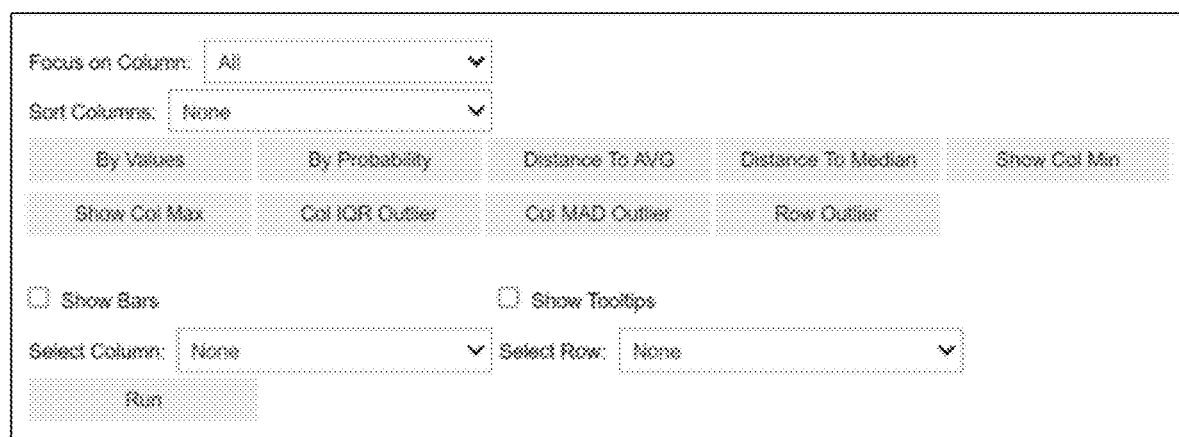
FIG. 3 shows a diagram of a data analyzer highlighter panel in a user interface, according to an embodiment.

FIG. 3 shows a diagram 300 of a data analyzer highlighter panel in a user interface, according to an embodiment. The Data Analyzer Highlighter may be a tool integrated into a data analytics software application. For example, after the end user builds a data table and the data is loaded in the data analytics software application, the end user may activate the Data Analyzer Highlighter tool to obtain information about the loaded data.

When the Data Analyzer Highlighter tool is activated, a tool panel, as shown diagram 300 in FIG. 3 may be opened to allow the end user to select the additional information to display. As shown in diagram 300, the highlighter panel contains a highlighter content component that is composed of dropdown box components and button components and a 'Run' button. The end user may select the options in the highlighter content component to specify what additional information is demanded and then click the 'Run' button to trigger the button event where the demanded additional information is extracted dynamically. The panel is closed then. The selected items in the highlighter content component may be preserved when the panel is opened again. But if the end user changes any options in the highlighter content component and click the 'Run' button, new additional information may be extracted according to the changes. In this way, the end user can keep changing the additional information so as to identify the interesting points from the data. In other embodiments the layout of components can be changed to suit a different GUI design.

As shown in the diagram 300, the additional information that can be provided to the end user is included in the highlighter content component. The highlighter content component is composed of dropdown boxes and buttons, by which the type of additional information that is supposed to help understand the loaded data can be specified. The component items are listed below.

The "Focus on Column" dropdown box has items includes feature names. Highlighter ContentComponent allows to specify the columns, from which the additional information will be extracted. By default, statistical methods will be performed independently on all features of the original data. However, if any column is selected in this component item, additional information will be only extracted from the specified column. This may be necessary when the end-user only has interest in a subset of features but still wants to view the data from all columns. Multiple selection may be allowed in this component items.

The "Sort Columns" dropdown box has three items: "By Variance", "By Distribution" and "By Information". This item allows to change the order of columns in data table so that the interested columns can be displayed to the end user first.

The "By Value" button may highlight the column values by colors in terms of values so that the end user can quickly understand whether one value in one record is big or small, comparing to other values from the same column.

The "By Probability" button may highlight the column values by colors in terms of the probability of values so that the end user can quickly understand the probability of one value in one record based on other values from the same column. This may help the end user to identify common values and special values in each column.

The "Distance to AVG" button may highlight the column values by colors indicating the difference between one value and the average of its corresponding column. This may help the end user to generally understand the distribution of column values. This may also help the end user quickly identify the values in one column that are far away from the average, which may need further investigation.

The "Distance to Median" button may highlight the column values by colors indicating the difference between one value and the median of its corresponding column. This will help the end user quickly identify the values in one column that are far away from the median, which thus needs further investigation.

The "Show Col Min" button may highlight the minimal values in each column by background colors. This will help the end user quickly identify the records having minimal values in interesting columns.

The "Show Col Max" button may highlight the maximal values in each column by background colors. This will help the end user quickly identify the records having maximal values in interested columns.

The "Col IQR Outlier" button may highlight the outliers in each column by background colors. The Interquartile Range (IQR) method is performed to identify the outliers. This will quickly help the end user identify anomalous values in each column and furthermore, identify the records having many anomalous values for further investigation.

The "Col MAD Outlier" button will highlight the outliers in each column by background colors. The median absolute deviation (MAD) method is performed to identify the outliers. This will quickly help the end user identify anomalous values in each columns and furthermore, identify the records having many anomalous values for further investigation.

The "Row Outlier" button may highlight the records with low probability to occur so that the end user can quickly identify the anomalous records. Being different from the "Col IQR Outlier" button and the "Col MAD Outlier" button, outliers detected with this button is based on the whole records, instead of a value from one column.

The "Show Bars" checkbox may highlight the values not only by colors but also by bars displayed in the background of each data cell. This checkbox item works with the "By Value" button, the "By Probability" button, the "Distance to AVG" button, and the "Distance to Median" button, where bars are visualized with the same meaning of these buttons. Using colors on values can help the end user easily identify special values or records for further investigation, and using bars can make such process even more efficient.

The "Show Tooltips" checkbox may open a floating panel when the end user moves the mouse over the values. Any information, for instance, the probability of current value, minimal/maximal values of the column and so on, can be added as tooltips to display. This will efficiently bring more information about one value to the end user with a simple mouse movement.

The "Select Column" Drop-down box may allow the end user to select one column, based on which the most correlated columns could be highlighted. This will quickly help the user identify more interested columns when viewing one column.

The "Select Row" Drop-down box may allow the end user to select one record, based on which the records that are similar or have the same behavior could be highlighted. This may quickly help the user identify more interested records when viewing one record.

Figure 4:
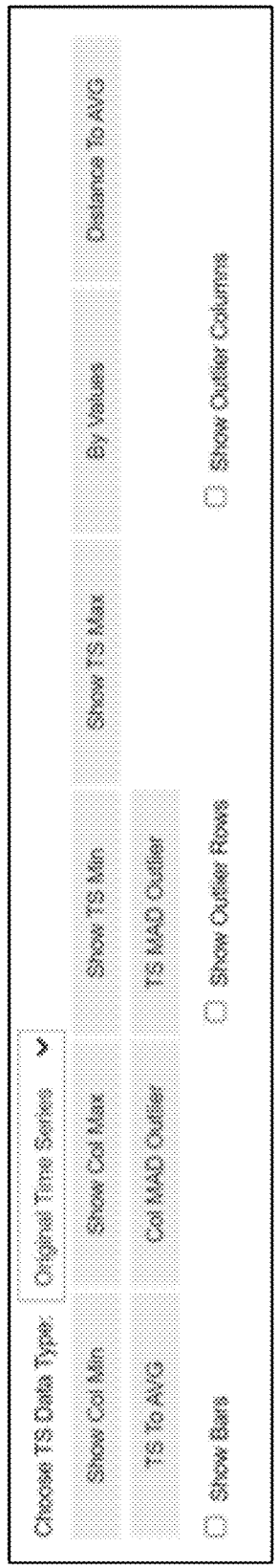
FIG. 4 shows a diagram of time series support for the data analyzer highlighter, according to an embodiment.

FIG. 4 shows a diagram 400 of time series support for the data analyzer highlighter, according to an embodiment. The Data Analyzer can support time series data where the end user can include the time points in time series as columns in the data table. However, to better understand the time series columns, special treatment may be helpful because columns in ordinary data are regarded as independent but time points are associated with each other in time series. This means more additional information may be extracted from the time series data. Thus, when there are time series columns included in the data table, additional component items should be considered in the Highlighter Content Component as shown in diagram 400. The additional component items for time series are listed below.

The "TS Data Type" dropdown box has four items: "Original Time series", "Time Series Change", "Moving Average" and "Moving Average Change". This allows the end user to view the time series data from four perspectives:
  With the "Original Time series" option, the end user can view the original time series data.
  With the "Time Series Change" option, the end user can view the change between one time point and its previous time point, based on the original data.
  With the "Moving Average" option, the end user can view the calculated 3-point moving average values for each time point, based on the original data.
  With the "Moving Average Change" option, the end user can view the changes of moving average values between two time points.

The "Show TS Min" button may highlight the time point with minimal value in each time series record by background color. This may help the end user quickly identify the time point with lowest value in a time series. Moreover, given a set of time series, it may be easy to identify the time points that are more likely to have lowest values.

The "Show TS Max" button may highlight the time point with maximal value in each time series record by background color. This may help the end user quickly identify the time point with highest value in a time series. Moreover, given a set of time series, it may be easier to identify the time points that are more likely to have highest values.

The "TS to AVG" button may highlight the values of time series by colors indicating the difference between the value at one time point and the average of values of the time series. This may help the end user quickly identify the values in one time series that are far away from the average. Then given a set of time series, the end users can easily identify the time points that are more likely to have special values.

The "TS MAD Outlier" button may highlight the anomalous time points in each time series record by background colors. The median absolute deviation (MAD) method is performed to identify the outliers. This may quickly help the end user identify anomalous values and the time points in each time series and furthermore, identify the time points that are more likely to have anomalous values, given the set of time series records.

The "Show Outlier Rows" checkbox may sort the records according to the number of anomalous values identified in each time series to highlight the time series records with more anomalous values. Specifically, the time series records with more anomalous values may be displayed on top of the data table and the time series records with fewer anomalous values will be displayed afterward. This option is helpful when the end user only have interest in the time series records with anomalous values.

The "Show Outlier Columns" checkbox may sort the columns according to the number of anomalous values existing in the corresponding time points across all time series records. Specifically, the columns with more anomalous values in the corresponding time points may be displayed before the columns with fewer anomalous values. This option is helpful when the end user only have interest in the time points with more anomalous values.

The Data Analyzer Highlighter Panel is designed to allow the end user to select the additional statistical information. When the end user specifies the interested information and click the "Run" button, the requested information is extracted and the data in data table is highlighted based on the extracted additional information. The extracted information may not be shown to the end user in a separated panel or chart. Instead, a more user-friendly solution is provided, where the additional information is used to highlight the existing data in data table so as to bring attention to interesting points to the end user. In this way, the end user can not only view the data, but also can get insight of the data efficiently and take the additional information into account for further analytics tasks. In the Data Analyzer Highlighter tool, highlighting the data in data table with additional statistical information may be fulfilled by marking the data with pre-defined color maps and using bars for simple visualization. The detailed highlighting techniques are described in further detail below.

Highlight Column Values by Values

Figure 5:
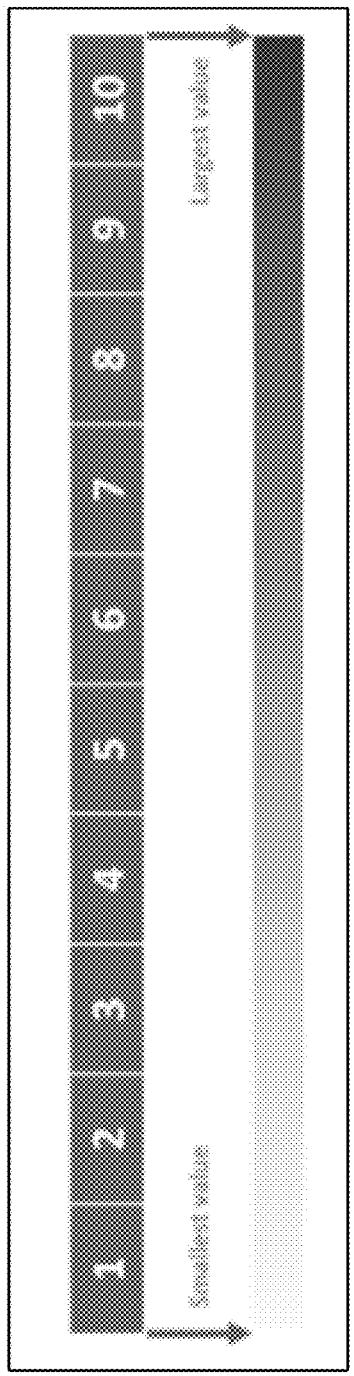
FIG. 5 shows a diagram of distributing continuous values on a color map, according to an embodiment.

One way to highlight column values is by values themselves. Specifically, all values in one table column are sorted, where the smallest value and largest value are identified. At the same time, a color map with gradient colors is predefined, in which the lightest color is assigned to the smallest value and the darkest color is assigned to the largest value. All values between the smallest one and the largest one are equally distributed on the gradient colors in color map. FIG. 5 shows a diagram 500 of distributing continuous values on a color map, according to an embodiment. Here, numbers 1-10 are equally distributed on a "YlOrRd" color map. The smallest number, 1 corresponds to the lightest color, light yellow and the largest number, 10 has the darkest red color, for example (the colors are converted to grayscale in FIG. 5). As output, all values in the table column are marked by their corresponding colors in color map. The same highlighting process is repeated to all the table columns.

Figure 6:
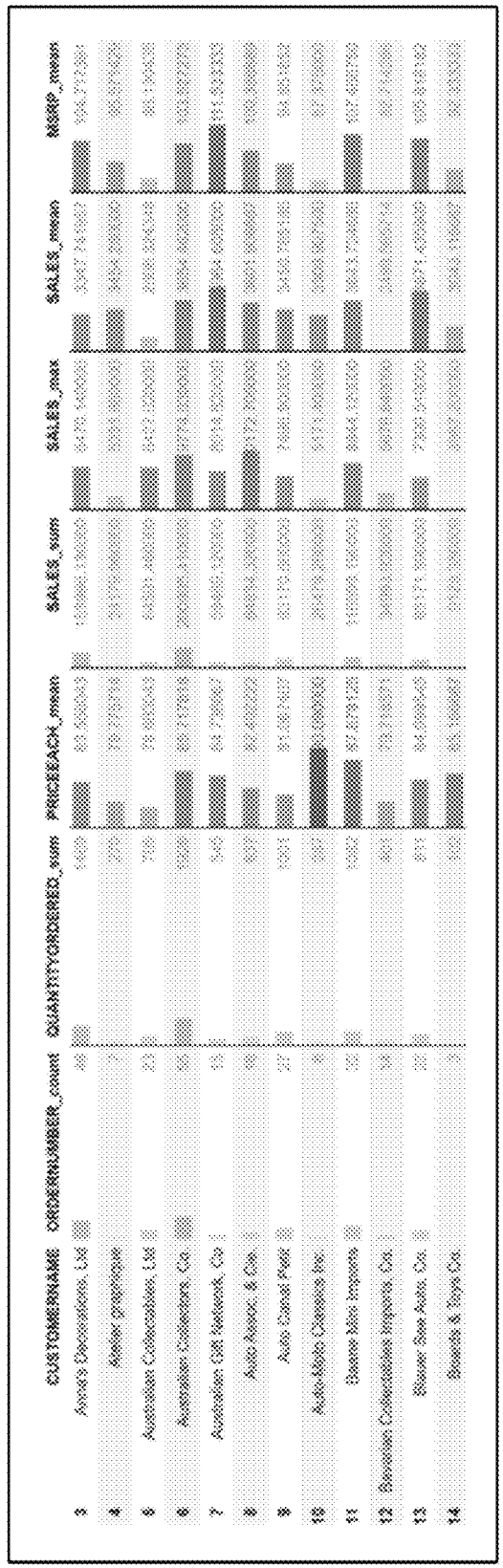
FIG. 6 shows a diagram of the data analyzer highlighter highlighting column values by values, according to an embodiment.

FIG. 6 shows a diagram 600 of the data analyzer highlighter highlighting column values by values, according to an embodiment. In addition to using colors to mark the column values, bars can be used, where the length of a bar is determined by the value in the column. The bars may be embedded in the table cells beside the column values. By combining color marking and bar visualization, the data table in Data Analyzer module could be enhanced as shown in FIG. 6, when the "By Value" button is activated in the Data Analyzer Highlighter Panel.

The Data Analyzer Highlighter tool can greatly bring richer information about values as discussed below.

The assigned colors and bar visualization can help the end user quickly understand how large or small one value is comparing to other column values. For example, when the revenue of company A is interested, the color assigned to the revenue value of company A can easily indicate whether it is a large revenue or a small one. This is efficient and crucial, especially when the data size is large, it is difficult for the end user to check and remember all the values in one column and then understand the position of certain values in terms of quantity. On the other side, this is almost always the first question the end user could have about the column values.

The assigned colors and bar visualization can help the end user quickly identify the extreme values (large values or small values) and their corresponding entities. This will save time and effort for the end user because it is unnecessary to check all the column values and then look for the extreme values in the data column.

By the assigned colors and bar visualization, the end user can quickly have an overview of distribution of the column values which is a very common step to start analytics. This means given the smallest value and the largest value in one column, the assigned colors can quickly show how the values of one data column are distributed between the smallest value and the largest value. Rules are listed below.

When there are only few colors appearing in the table column, the column values are more likely distributed in certain intervals, causing obvious skewness. Then the extreme values will be more likely to be anomalous. An example is the QUANTITYORDERED_sum column in diagram 600.

When there are many colors appearing in the table column, the column values are more normally distributed. Then the extreme values will be less likely to be anomalous. An example is the MSRP_mean column in diagram 600. Such table column usually can bring more information in predictive models but less attention should be given by the end user directly.

Highlight Column Values by Probability

Figure 7:
FIG. 7 shows a diagram of the data analyzer highlighter highlighting column values by probability, according to an embodiment.

FIG. 7 shows a diagram 700 of the data analyzer highlighter highlighting column values by probability, according to an embodiment. In data analytics, a useful way to understand a value in a data table is to check whether this column value commonly exists given all the column values, which is measured by probability of one value given all values in one table column. The Highlighter tool allows to provide information about the probability of column values. Specifically, given all the values in one column, the probability is calculated for each of column values, which is based on percentage. A color map with gradient colors is predefined, in which the lightest color is assigned to 0 and the darkest color is assigned to 100. All probabilities of values in the column are equally distributed on the gradient colors in color map. As output, all values in the table column are marked by their corresponding colors. The same highlighting process is repeated to all the table columns. In additional to using colors to mark the column values, bars can be used. By combining color marking and bar visualization, the end user can easily get the information about probability of values while they view the data in data table as shown in diagram 700, when the "By Probability" button is activated in the Data Analyzer Highlighter Panel.

In diagram 700, the Data Analyzer Highlighter tool can greatly bring richer information from probability perspective to the end user as discussed below:

When the end user has interest in one value of a table column, it may be easy to understand whether the interested value is likely occurring or a rare event by using the color and bar. This is efficient and crucial, especially when the data size is large as it is impossible for the end user to check and remember all the values in one column.

The assigned colors and bar visualization can help the end user easily understand the column values to know the common values or special values in one table column. This may be crucial in analytics because one column in the data table usually corresponds to one measurement, and it is important for the end user to have a general overview of the measurement to understand them from a particular perspective. The colors can make it much easier for the end user to group the values.

The assigned colors and bar visualization can efficiently bring attention to the end user of the records having many values with low probabilities as rare events. The human cannot process information with many dimensions so as to give direction for further investigation.

Highlight Column Values by Deviation from Average

Figure 8:
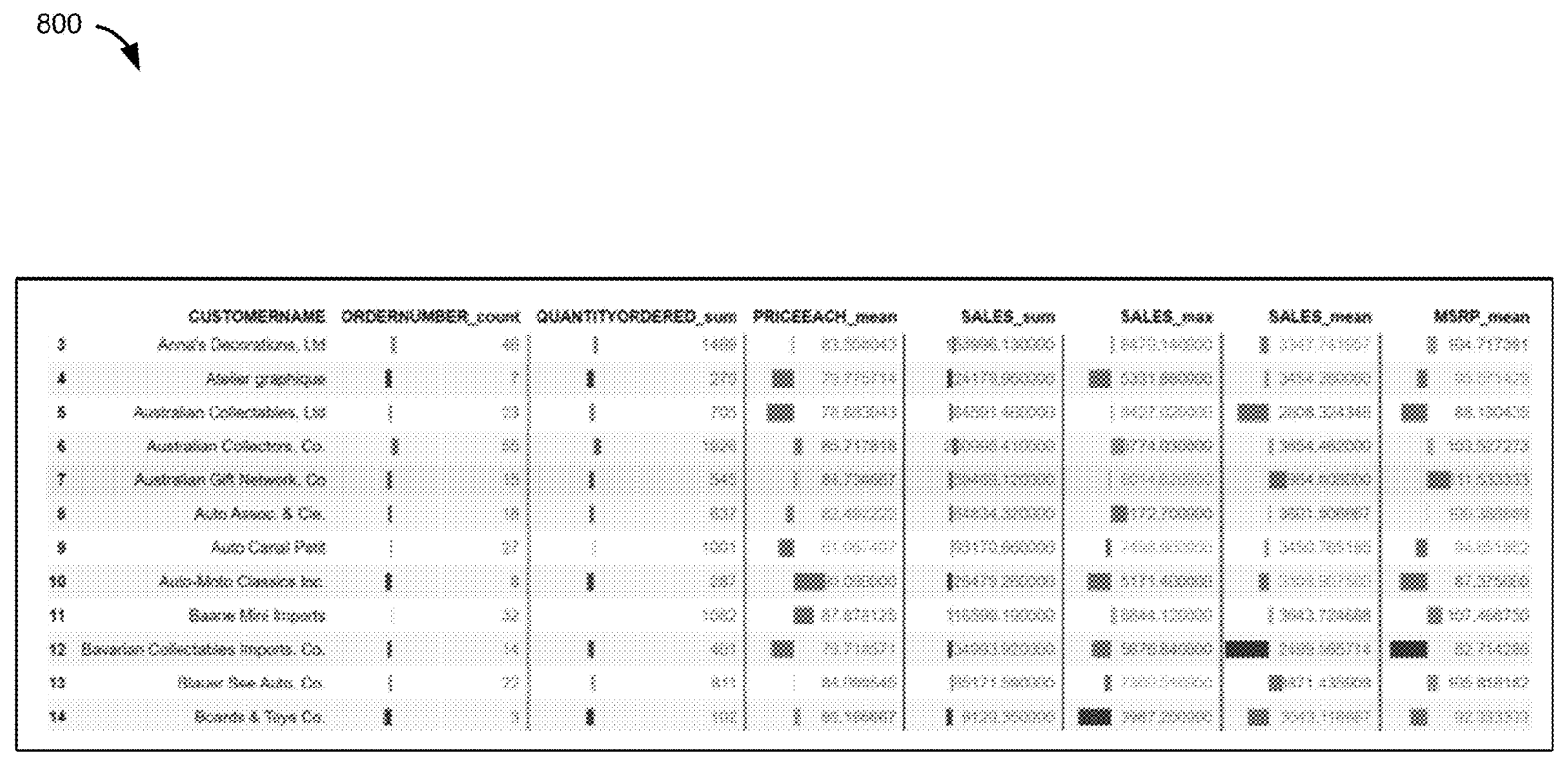

FIG. 8 shows a diagram 800 of the data analyzer highlighter highlighting column values by deviation from average, according to an embodiment. In data analytics, to understand values of a measure, average value and median value are widely used. This may be based on an assumption that average or median can reasonably represent a measure. At the same time, given an average derived from a set of values, it is important to observe the deviation between the values and their average, because the deviation from average can bring rich information about the observed measure. This is also applied to the median. The Highlighter tool provides information about the deviation from average and median of table columns to help the end user better understand the data. Specifically, the average is calculated based on all values in one table column and then the deviation between each value and the derived average is calculated. It is worth noting the deviation is calculated without absolute operation, which means the deviation could be positive or negative. When all the deviation values are obtained, the smallest deviation and the largest deviation are identified. At the same time, a color map with gradient colors is predefined, in which the two colors at both ends of color map are assigned to the smallest deviation and the largest deviation respectively and the color in the middle of color map is assigned to the average value. All deviation values between the smallest one and the largest one are equally distributed on the gradient colors in color map. As output, all values in the table column are marked by their corresponding colors in color map. The same highlighting process is repeated to all the table columns. It is worth noting such process can be applied to median value.

In addition to using colors to mark the column values, bars can be used, where the length of a bar is determined by the deviation value. Because the deviation value could be positive or negative, the bar visualization should support this. It is thus suggested that the bar has a zero point, indicating the average, with positive values to the right and negative values to the left. By combining color marking and bar visualization, the data table in Data Analyzer module could be enhanced to show the information of deviation to average as shown in diagram 800, when the "Distance to Avg" button is activated in the Data Analyzer Highlighter Panel. It is worth noting that the same process can be applied to the median value directly.

As shown in diagram 800, the Data Analyzer Highlighter tool can greatly bring richer information about the average and the deviation as discussed below:

The assigned colors and bar visualization can help the end user quickly identify the column values that are close to the average or median.

The assigned colors and bar visualization can help the end user easily understand the deviation of one value to the average or median in that column. This means the end user can quickly identify those values that are largely deviated from the average as outliers in table columns.

By the assigned colors and bar visualization, the end user can quickly have an overview of distribution of column values and especially understand the skewness of that column. This means given the values in one column, the assigned colors can clearly show how the values are distributed around the average or median. Several rules are listed below:

When there are only few colors appearing in the table column, the column values are more closely distributed around the average, causing obvious skewness. Then the values that are far away from the average will be more likely to be anomalous. An example is the QUANTITYORDERED_sum column in diagram 800.

When there are many colors appearing in the table column, the column values are more normally distributed around the average. Then the values that are far away from the average will be less likely to be anomalous. An example is the MSRP_mean column in diagram 800. Such table column usually can bring more information in predictive models but less attention should be given by the end user directly.

When there are colors that are only for positive deviations, the column values are more likely positively deviated from the average.

When there are colors that are only for negative deviations, the column values are more likely negatively deviated from the average.

By the assigned colors and bar visualization, the end user can quickly identify table columns that could be correlated. This is done by the factor that when column values in two columns have similar deviations from the average or median, these two columns are likely to be correlated. Thus based on the colors and bars, when the values in two columns are assigned similar colors or similar length of bars, they could be correlated. An example is the QUANTITYORDERED_sum column and the ORDERNUMBER_count column, which have very similar deviation of average, are correlated through statistical calculation.

Highlight Values of Records by Deviation from Average

Figure 9:
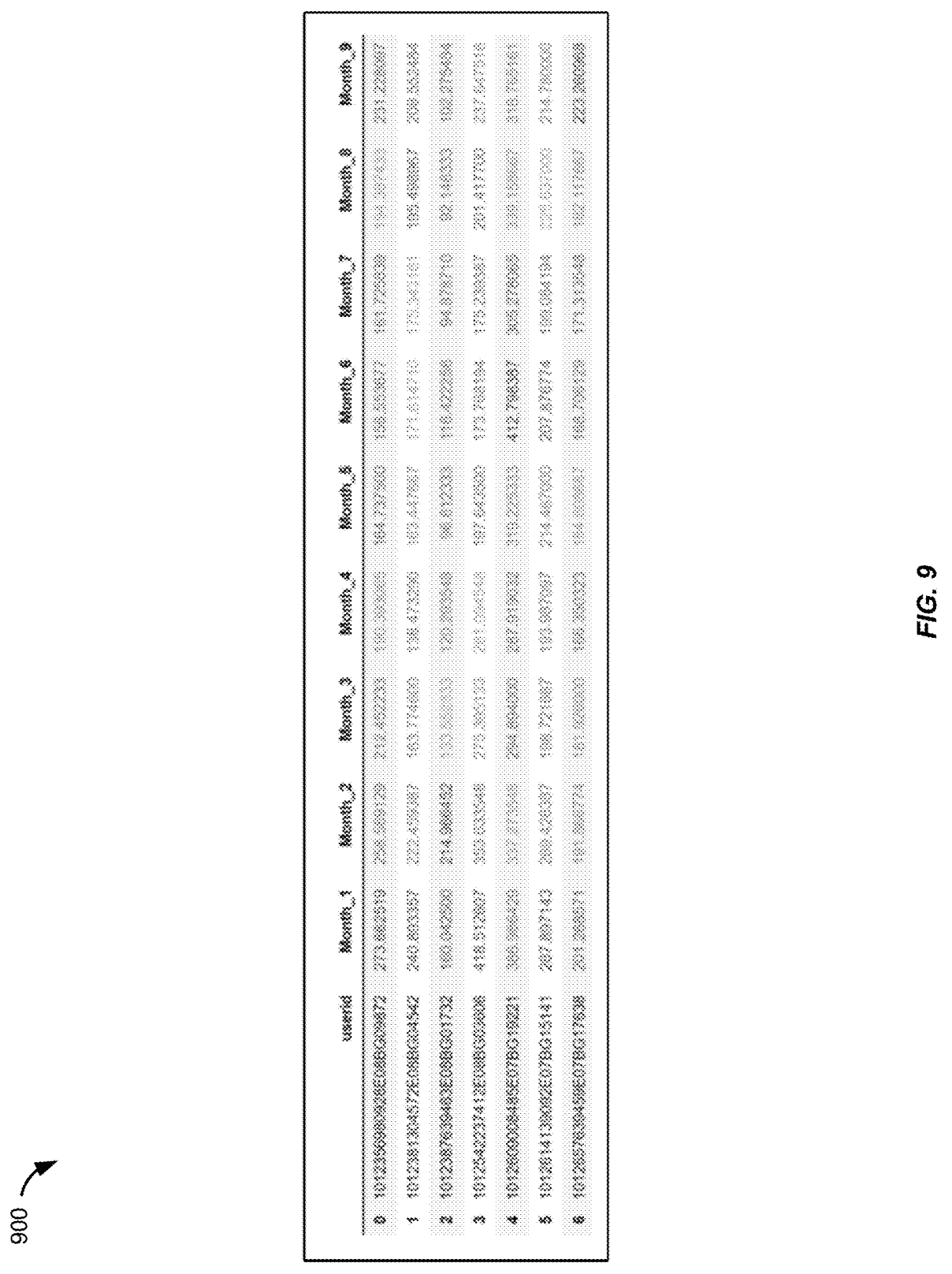

FIG. 9 shows a diagram 900 of the data analyzer highlighter highlighting values of records by deviation from average, according to an embodiment. Apart from highlighting the column values by deviation from average, the Highlighter tool allows to highlight the values of records by deviation from average. This means the average of all values in each record is calculated and the deviation between each value in the record and the calculated average is derived for each value of records. It is worth noting that observing deviation from average of each record is usually considered to be pointless as all the table columns are assumed to be independent. However, this becomes useful for time series data. Being similar to highlight the column values, all values in the record are marked by their corresponding colors in color map. The same highlighting process is repeated to all the records. It is worth noting that such process can be applied to median value. As output, the time series data could be enhanced to show the information of deviation to average as shown in diagram 900, when the "TS to Avg" button is activated in the Data Analyzer Highlighter Panel.

Highlight Extreme Column Values

FIG. 10 shows a diagram 1000 of the data analyzer highlighter highlighting extreme column values, according to an embodiment. Finding the extreme values in table columns is a very common way to help the end user understand column values. The Highlighter tool allows to highlight the minimal value and the maximal value of each table column. The extreme values are highlighted by changing their background color as shown in diagram 1000, when the "Show Col Min" button and the "Show Col Max" button are activated in the Data Analyzer Highlighter Panel.

Comparing to the current Data Analyzer design where only data is displayed in the data table, it can be obviously seen in diagram 1000 that the Data Analyzer Highlighter tool can greatly bring richer information about the extreme values as discussed below:

- By changing background color, the end user can easily identify the extreme values.
- The end user can easily understand how the extreme values are distributed in the table column. For example, the minimal value is quite common in DEALSIZE_Large column.
- The end user can quickly identify the records with many extreme values for further investigation.

Highlight Extreme Values of Records

Figure 11:
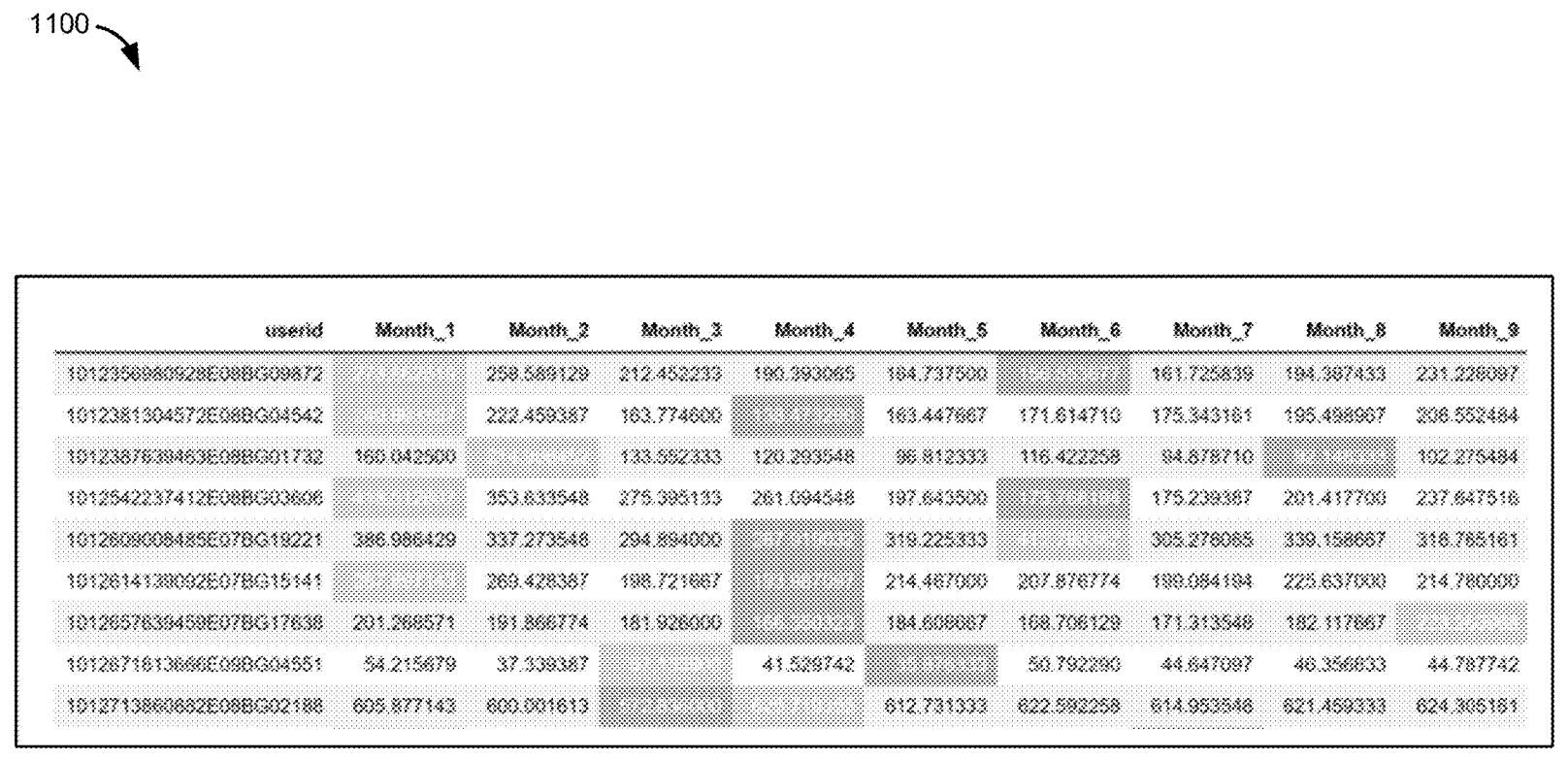

FIG. 11 shows a diagram 1100 of the data analyzer highlighter highlighting extreme values of records, according to an embodiment. Apart from finding the extreme values in table, the Highlighter tool allows to highlight the minimal value and the maximal value of each record. It is worth noting that finding extreme values of each record is usually considered to be pointless as all the table columns are assumed to be independent. However, this becomes important when time series is included in the data and the end user needs to quickly identify the peaks in time series. The extreme values of records are highlighted by changing their background color as shown in diagram 1100, when the time series data is loaded and the "Show TS Min" button and the "Show TS Max" button are activated in the Data Analyzer Highlighter Panel.

As shown in diagram 1100, the Data Analyzer Highlighter tool can greatly bring richer information about the extreme values as discussed below:

- By changing background color, the end user can easily identify the extreme values in each record. When time series is included, the peaks of each time series can be quickly identified.
- For time series records, the end user can quickly identify the time points where peaks more likely occur.

Highlight Outliers of Column Values

Figure 12:
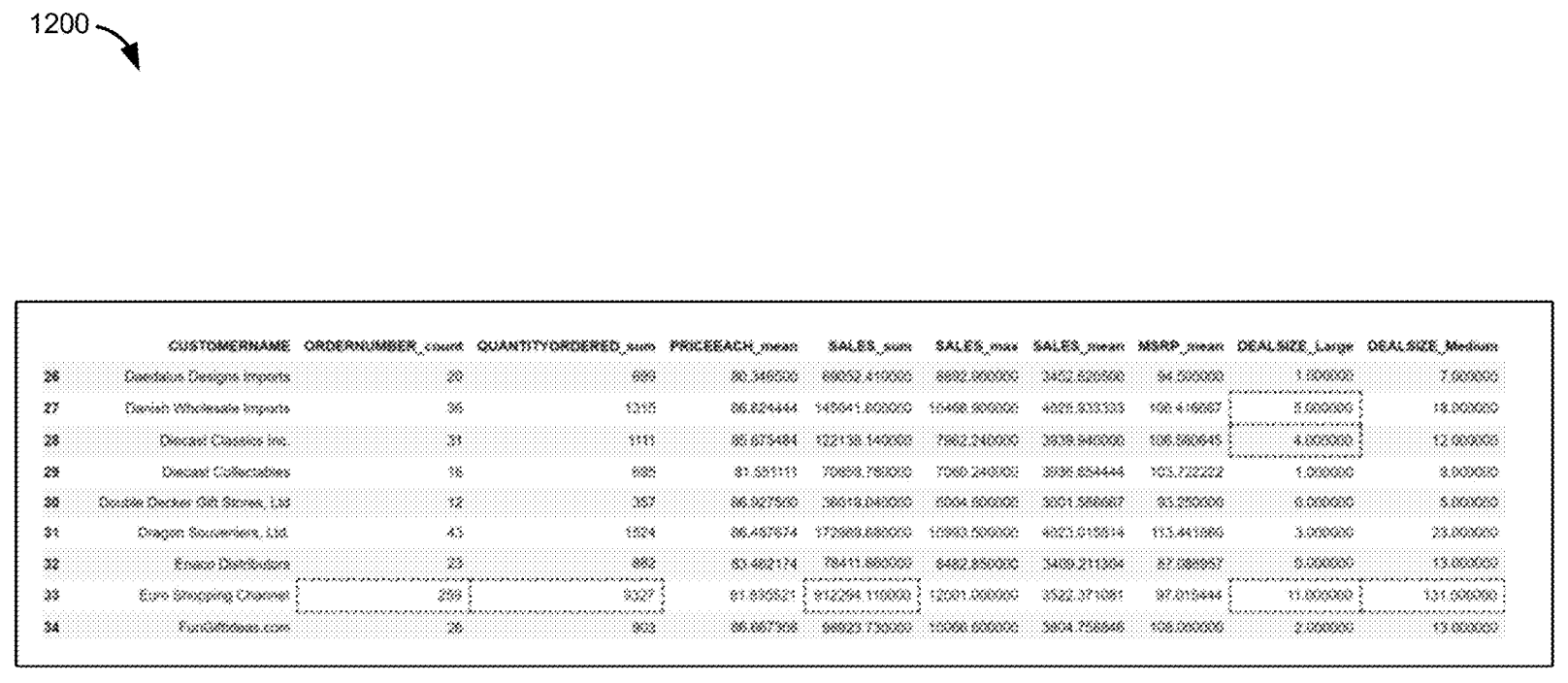

FIG. 12 shows a diagram 1200 of the data analyzer highlighter highlighting outliers of column values, according to an embodiment. In analytics, when the end user views the data, it is always important to identify outliers from the column values for further investigation. The Highlighter tool allows to highlight the outliers identified from column values. Specifically, given the values from one column, outliers are first detected. The identified outliers are marked by dashed blocks to bring attention to the end user. It is worth noting that the Interquartile Range (IQR) method and the median absolute deviation (MAD) method are considered to be the suitable algorithms in this work. It is worth noting that in implementation, it is unnecessary to use dashed blocks but other suitable way to highlight the outliers could also be used. As output, the outliers are highlighted as shown in diagram 1200, when the "Col IQR Outlier" button or the "Col MAD Outlier" button are activated in the Data Analyzer Highlighter Panel.

As shown in diagram 1200, the Data Analyzer Highlighter tool can greatly bring richer information from outliers as discussed below:

- The end user can easily get attention of the outliers from each columns, when the data is viewed.
- The end user can quickly identify the measures that have more outliers. This could be greatly helpful for the end user to focus on particular factors.
- The end user can quickly identify the records that have more outliers. For example, as shown in diagram 1200, the record with customer name, "Euro Shopping Channel" has outliers from many columns. It will be very efficient for the end user to pay attention to this record for further investigation.

Highlight Outliers of Values in Records

Figure 13:
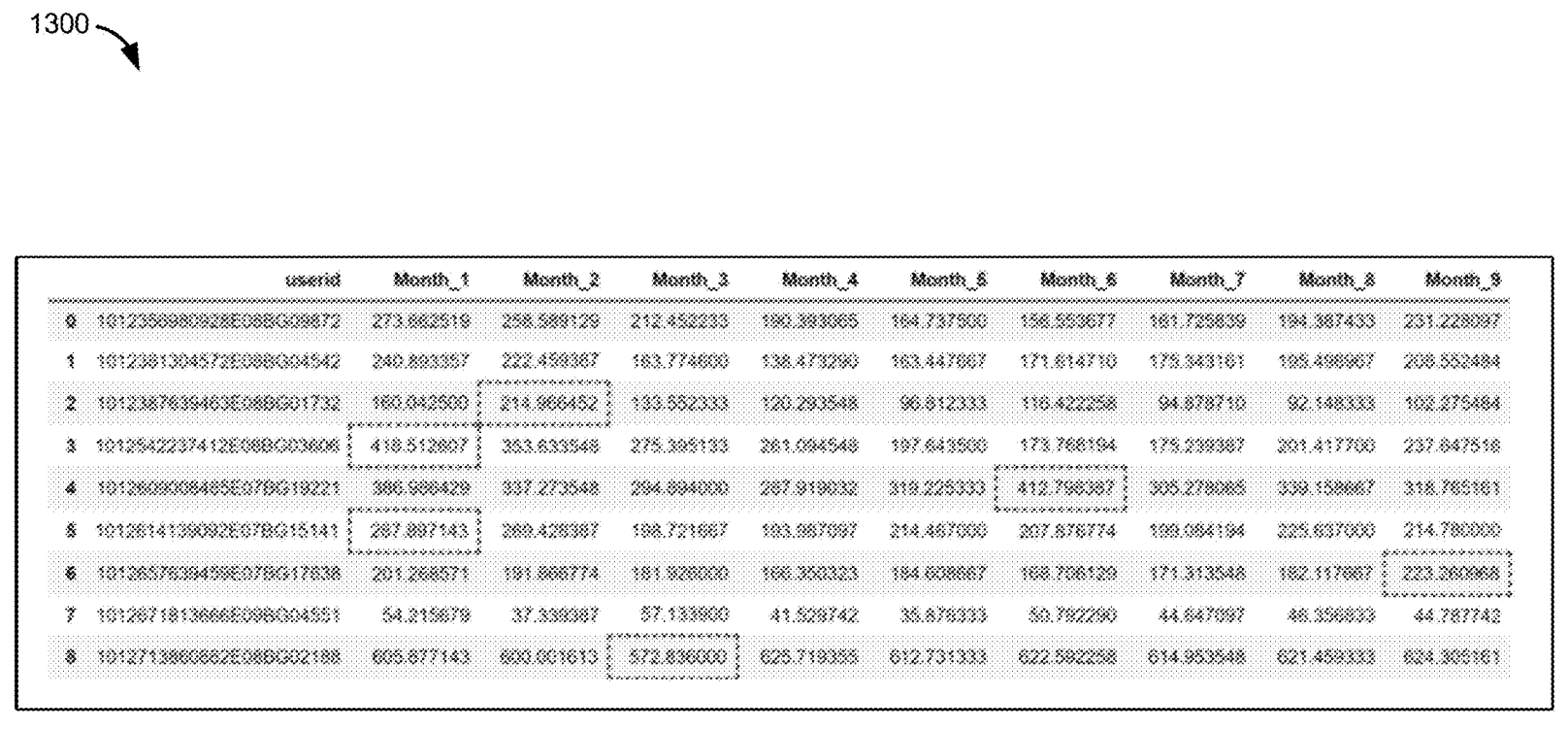

FIG. 13 shows a diagram 1300 of the data analyzer highlighter highlighting outliers of values in records, according to an embodiment. Apart from highlighting the outliers of column values, the Highlighter tool allows to highlight outliers from the values of each record. It is worth noting that finding outliers from values of each record may be considered to be pointless as all the table columns are assumed to be independent. However, for time series data, this becomes important because the end user needs to identify the anomalous values in the time series along with the time points. To identify the outliers from time series records, the same process can be reused as in highlighting the outliers of column values. As output, the outliers are highlighted as shown in diagram 1300, when the "TS MAD Outlier" button are activated in the Data Analyzer Highlighter Panel.

Figure 14:
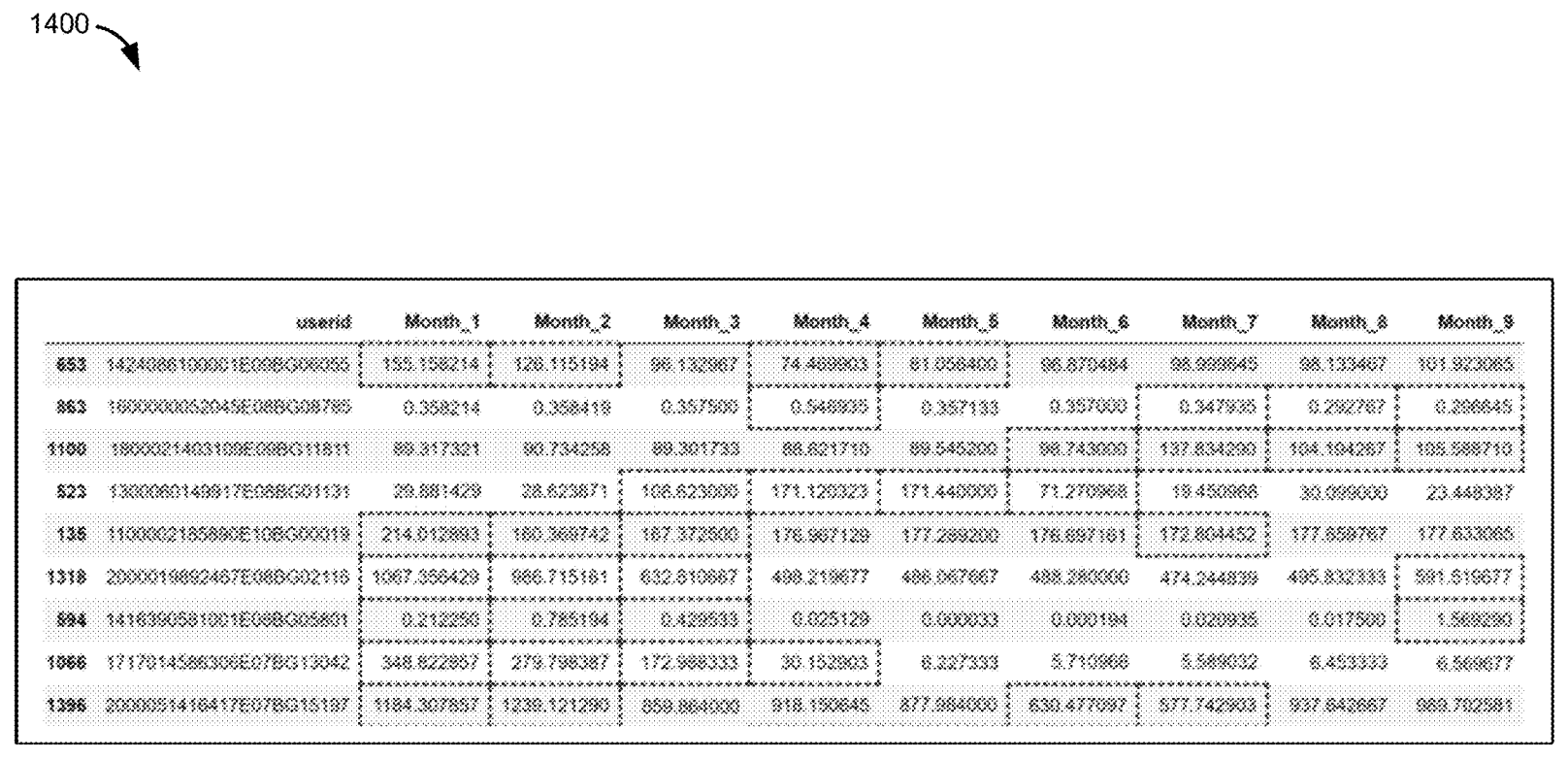

FIG. 14 shows a diagram 1400 of the data analyzer highlighter highlighting and reordering outliers of time series records, according to an embodiment. It is worth noting that it may not be sufficient to only highlight the outliers of time series records, because the identified anomalous values could spread on the whole time series data and thus become sparse for the end user. This issue could be serious to impact the user experience when the data size is large. Therefore, two further enhancements are considered in the Highlighter tool as discussed below:

- A "Show Outlier Rows" checkbox is added in the Data Analyzer Highlighter Panel to highlight the time series records with more anomalous values. Specifically, the time series records are ordered where the records with more anomalous values will be displayed before the records with less anomalous values. As output the end user can easily view and investigate the time series records with more outliers as shown in diagram 1400.
- A "Show Outlier Columns" checkbox is added in the Data Analyzer Highlighter Panel to highlight the time points with more anomalous values. Specifically, the columns of time series records are ordered where the time points with more anomalous values will be displayed before the columns with less anomalous values. As output the end user can quickly understand what time points are more likely having anomalous values and easily view the data in time points with more outliers. FIG. 15 shows a diagram 1500 of the data analyzer highlighter highlighting outliers of time series records and reordering, according to an embodiment. In this example, the time point of Month_1 is more likely having outliers and the time point of Month_5 is more stable.

Highlight Anomalous Records

Figure 16:
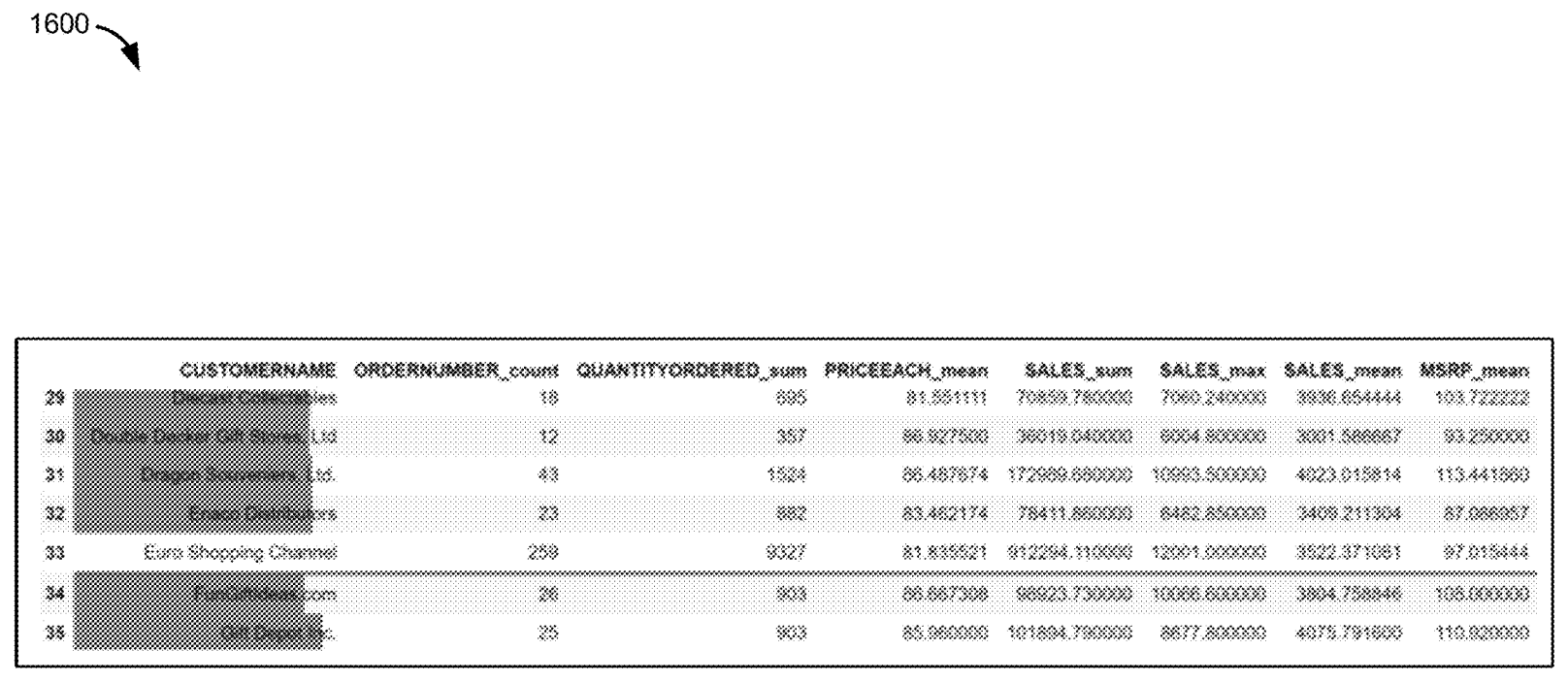

FIG. 16 shows a diagram 1600 of the data analyzer highlighter highlighting anomalous records, according to an embodiment. In analytics, when the end user views the data, they may be interested in identifying anomalous records for further investigation. Different from the outliers of columns, anomalous records are detected by taking all the columns into account and the records that are not likely occurred are regarded as anomalies. To detect the anomalous records, Gaussian Mixture Model (GMM) method is used. It is worth noting that the GMM method is one machine learning algorithm, which required training process. Therefore, highlighting anomalous records could require computing resource and model training. The detected anomalous records are marked by a solid underline to bring attention to the end user but other suitable way to highlight the anomalous records could also be used. One benefit of using the GMM algorithm is that the trained model can return the information of how likely one record can occur among the given data. One suitable way to show the likelihood is by using bars in the entity column. As output, the anomalous records are highlighted as shown in diagram 1600, when the "Row Outlier" button is activated in the Data Analyzer Highlighter Panel.

It is worth noting that highlighting the anomalous records can work with highlighting the outliers of columns. For example, as shown in diagram 1600, the record with customer name, "Euro Shopping Channel" is identified as anomaly and at the same time, as shown in diagram 1200, this record also has outliers from many columns. Then such consistency can quickly help the end user to focus on some records for further analysis.

Sort Table Columns by Different Criteria

Figure 17:
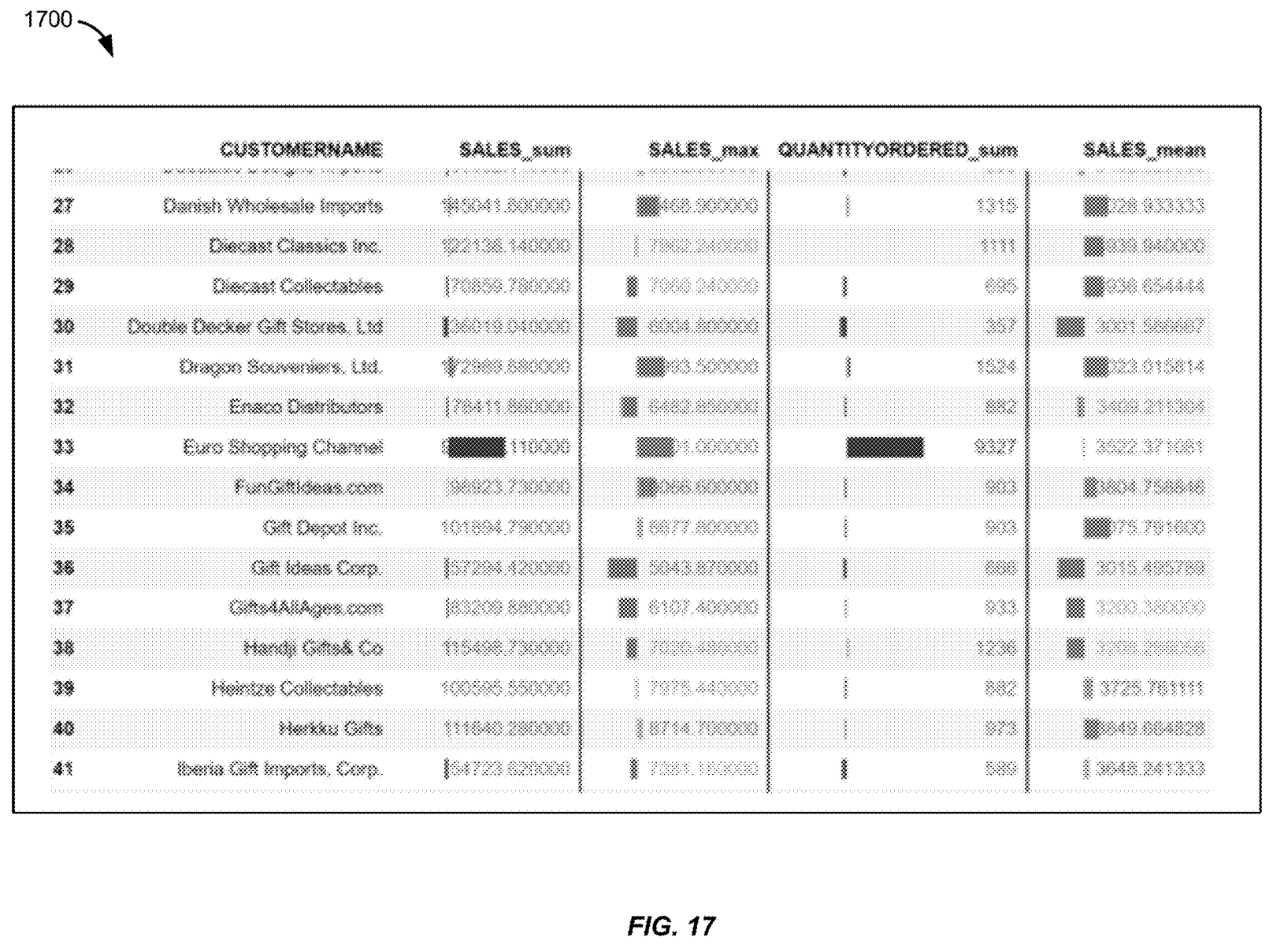

FIG. 17 shows a diagram 1700 of the data analyzer highlighter sorting table columns by variance, according to an embodiment. The data may include many measures and thus the data could be high dimensional with many table columns. In analytics, the end user may need to understand the data so as to quickly find out a subset of table columns that are useful for further analysis. The Highlighter tool allows to display the table columns in certain orders based on different criteria, which helps the end user to find out the interested table columns quickly. Specifically, the end user can choose the criteria in the Data Analyzer Highlighter Panel and then the table columns are sorted according to the selected criteria. Three criteria are suggested as below:

"By Variance" option will sort the table columns based on the variance of column values in each table column. This option is useful when the end user has more interest in the table columns with larger variance. When the "By Variance" is selected in the "Sort Columns" dropdown box in the Data Analyzer Highlighter Panel, the variance of column values of each table column is calculated. The variances are sorted from large to small, where their corresponding columns are ordered accordingly. As output, the data table is displayed with the sorted columns as shown in diagram 1700, where the SALES_sum column has largest variance and thus is displayed as the 1st column. The end user can thus easily focus on the data in first columns. It is worth noting that by highlighting the column values by deviation from average with bars at the same time, it will be easy for the end user to understand what causes the large variance so that some particular records can get attention. For example, as shown in diagram 1700, the "Euro Shopping Channel" customer has really large sales amount that is much deviated from the average while other customers have the sales that are so close to the average. This could be the reason that the SALES_sum has largest variance. It is thus of interest enough for the end user to investigate the purchase behavior of the "Euro Shopping Channel" customer.

Figure 18:
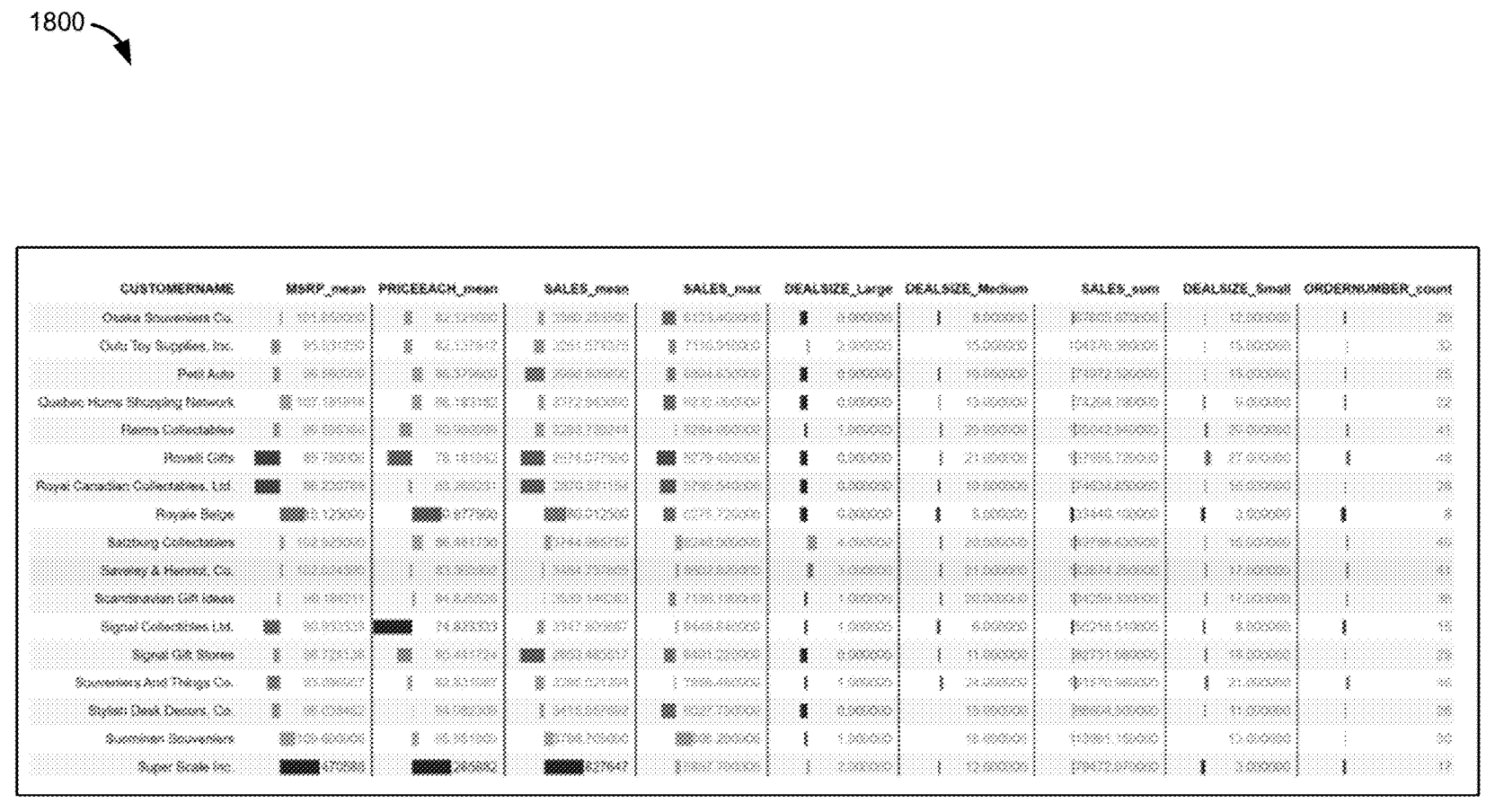

"By Flat Distribution" option will sort the table columns based on the Kurtosis measure of column values in each table column. This option is useful when the end user has more interest in the table columns where the values obviously spread around the average value. Such table columns can usually bring more information than the columns with stable values. When the "By Flat Distribution" is selected in the "Sort Columns" dropdown box in the Data Analyzer Highlighter Panel, the Kurtosis of column values of each table column is calculated. The Kurtosis values are sorted from large to small, where their corresponding columns are ordered accordingly. FIG. 18 shows a diagram 1800 of the data analyzer highlighter sorting columns by kurtosis, according to an embodiment. As output, the data table is displayed with the sorted columns as shown in diagram 1800, where the MSRP_mean column has largest Kurtosis and thus is displayed as the 1st column. The end user can thus easily focus on the data in first columns.

"By Information" option will sort the table columns based on a formula indicating amount of information in the table columns. This option is useful when the end user has more interest in the table columns having rich information. When the "By Information" is selected in the "Sort Columns" dropdown box in the Data Analyzer Highlighter Panel, the variance, $\delta$, and the skewness, $Skew(x)$, of column values of each table column are calculated. Then the amount of information is calculated as following:

$$Info = \frac{\frac{2}{1+e^{-2*0.000001*\delta}} - 1}{\frac{2}{1+e^{-0.2*|Skew|}} - 1}$$

Figure 19:
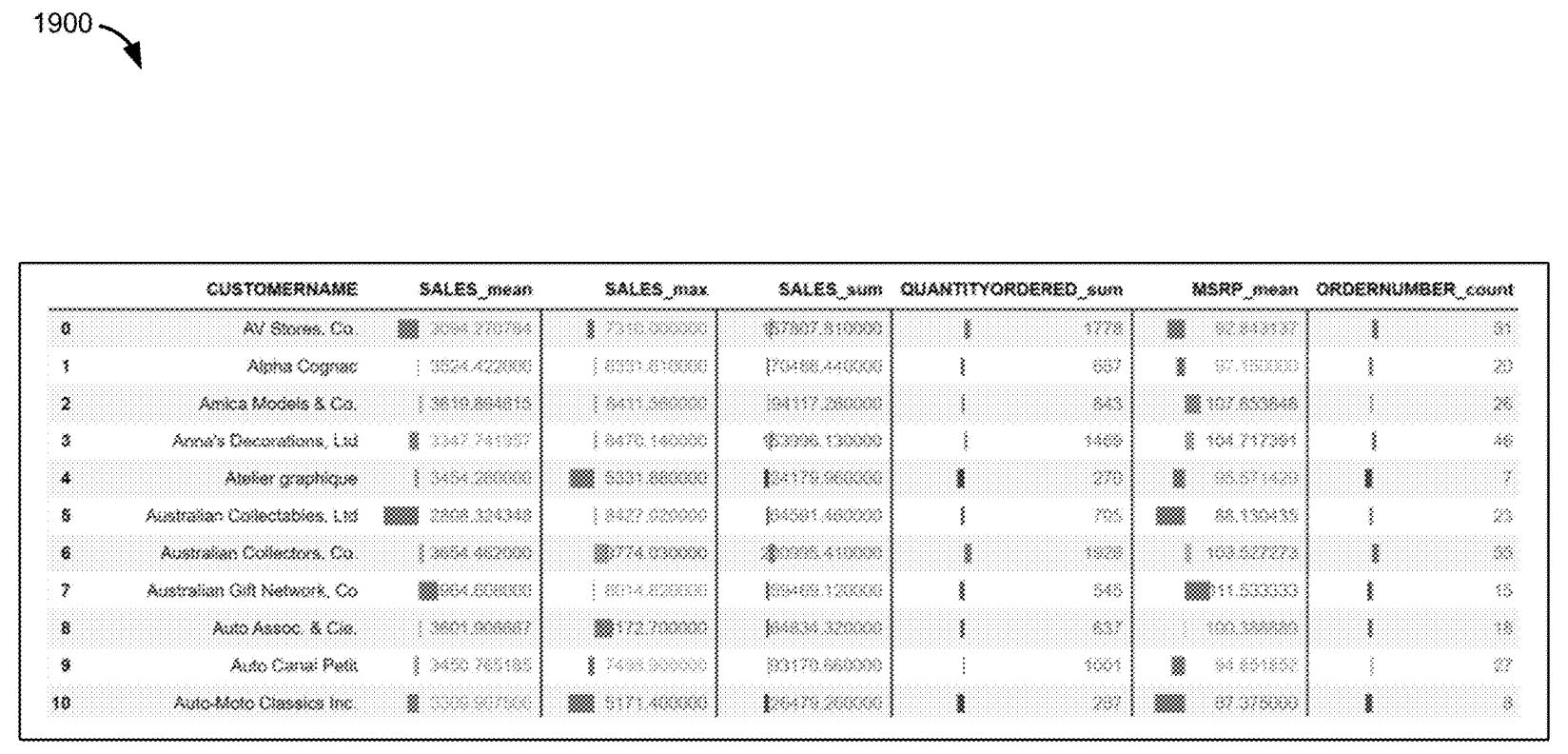

FIG. 19 shows a diagram 1900 of the data analyzer highlighter sorting columns by amount of information, according to an embodiment. The information values are sorted from large to small, where their corresponding columns are ordered accordingly. As output, the data table is displayed with the sorted columns as shown in diagram 1900.

Highlight Correlated Table Columns

Figure 20:
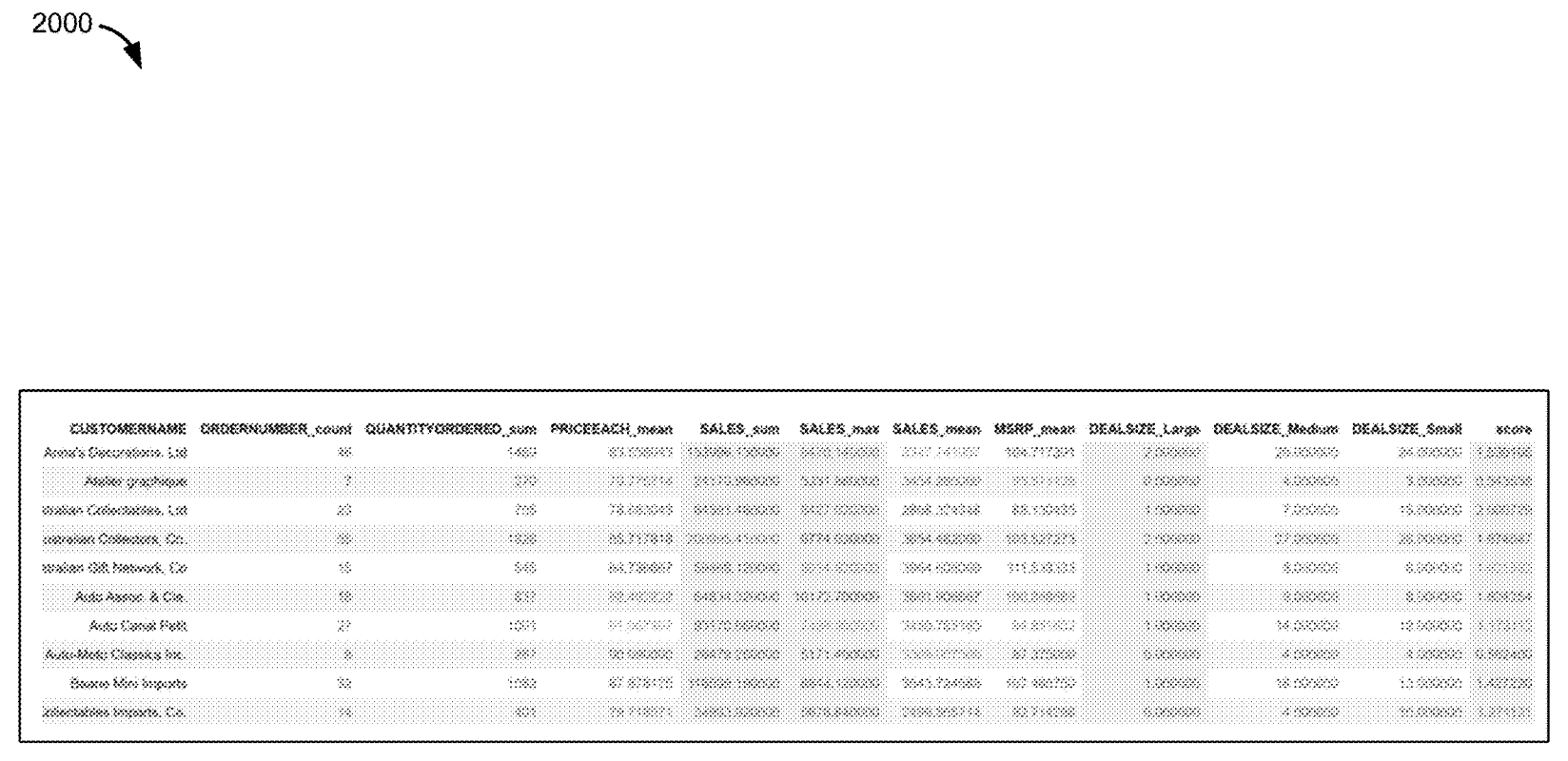

FIG. 20 shows a diagram 2000 of the data analyzer highlighter highlighting correlated table columns, according to an embodiment. When the end user has interest in one measure, the corresponding table column will be observed. And it will be natural to look for other columns that are closely related to the interested column. The Highlighter tool allows to highlight the top 3 table columns that are most correlated to the selected table column. Specifically, one interested column can be selected in the "Select Column" Drop-down box in the Data Analyzer Highlighter Panel. The correlations between the selected table column and other table columns are calculated. The calculated correlation values are sorted and the top 3 table columns with the largest correlation values are identified. When displaying the data table, the values from the identified 3 table columns are highlighted with background color. As shown in diagram 2000, the score column is selected and as a result, the SALES_sum column, the SALES_max column and the DEALSIZE_Large column are highlighted as they are most correlated to the score column.

Highlight Similar Records

FIG. 21 shows a diagram 2100 of the data analyzer highlighter highlighting similar records, according to an embodiment. When the end user has interest in one record, it will be common to look for several more records that are similar to the interested record because they could have similar behavior. The Highlighter tool allows to highlight the top 3 records that are most similar to the selected record.

Specifically, one interested record can be selected in the "Select Row" Drop-down box in the Data Analyzer Highlighter Panel. It is worth noting that the items in the "Select Row" Drop-down box should be unique to identify each record. The distances between the selected record and other records are calculated based on Euclidean distance. The calculated distance values are sorted and the top 3 records with the shortest distance are identified. When displaying the data table, the 3 identified records are highlighted with background color. As shown in diagram 2100, the record with customer name of "AV Stores Co." is selected and as a result, the three records are highlighted, where as highlighted, the record with customer name of "Anna's Decorations, Ltd" is one example.

Example Use Cases

Two datasets have been used to illustrate the Data Analyzer Highlighter tool:

A sales dataset with 2824 records is used. The Sales data originally includes order information, such as customer information, product information, and the detailed transaction information. The sales data is simulated to be loaded in the Data Analyzer, where the Sales records are aggregated on CUSTOMERNAME column in Data Analyzer. The aggregated sales data has sales information from each customer, where quantity, price, sales amount and deal size are observed to represent purchase behavior of customers. Furthermore, a special column, the 'Score' column, is added to indicate the deviation of maximal order from average value. Therefore, the aggregated sales dataset for demo has 93 records with 21 columns.

An energy consumption dataset is used to demonstrate the highlighter tool for time series data. The dataset has 1676 time series with 9 time points to represent the energy consumption between January and September from 1676 customers.

The two datasets are used to demonstrate how the Data Analyzer Highlighter Tool can enhance data analytics software application to help the end users to understand the loaded data efficiently. The demonstration is organized by use cases as below.

Use Case 1: Highlight Column Values by Values

Figure 22:
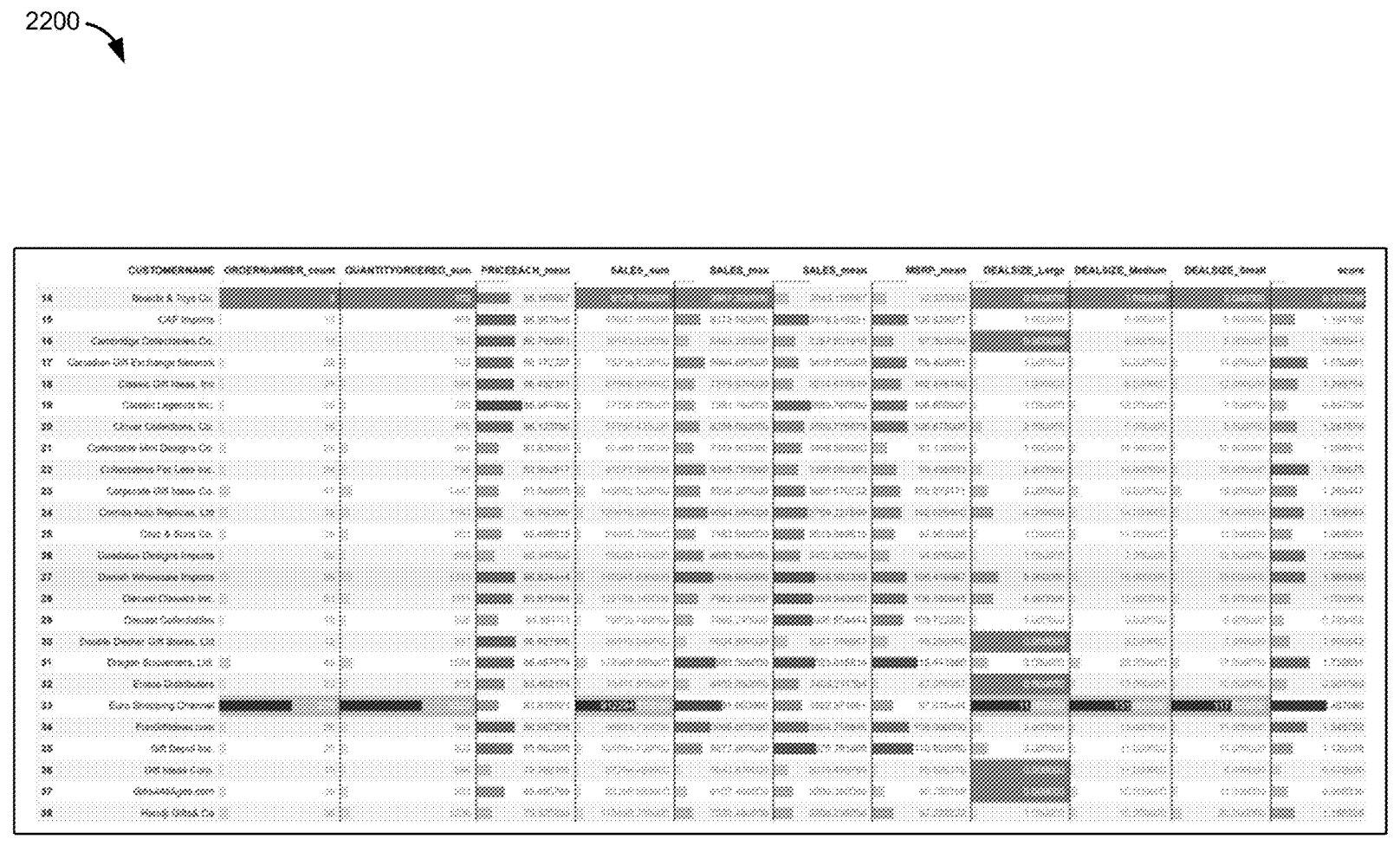

FIG. 22 shows a diagram 2200 of the data analyzer highlighter highlighting columns by values, according to an embodiment. The sales data is used in this use case. The "By Value" button, the "Show Col Min" button and the "Show Col Max" button are activated with "Show bar" checked in the Data Analyzer Highlighter Panel. The output is shown in diagram 2200.

Some useful information that the end user can efficiently get is listed below:

The No. 14 has many minimal column values. Further investigation may be needed.

The No. 33 has many maximal column values. Further investigation may be needed.

The ORDERNUMBER_count, QUANTITYORDERED_sum, SALES_sum, DEALSIZE_Medium, DEALSIZE_Small columns have large variance but with obvious skewness (more likely with abnormal values). This can be confirmed when plotting the actual distributions.

Use Case 2: Highlight Column Values by Deviation from Average

Figure 23:
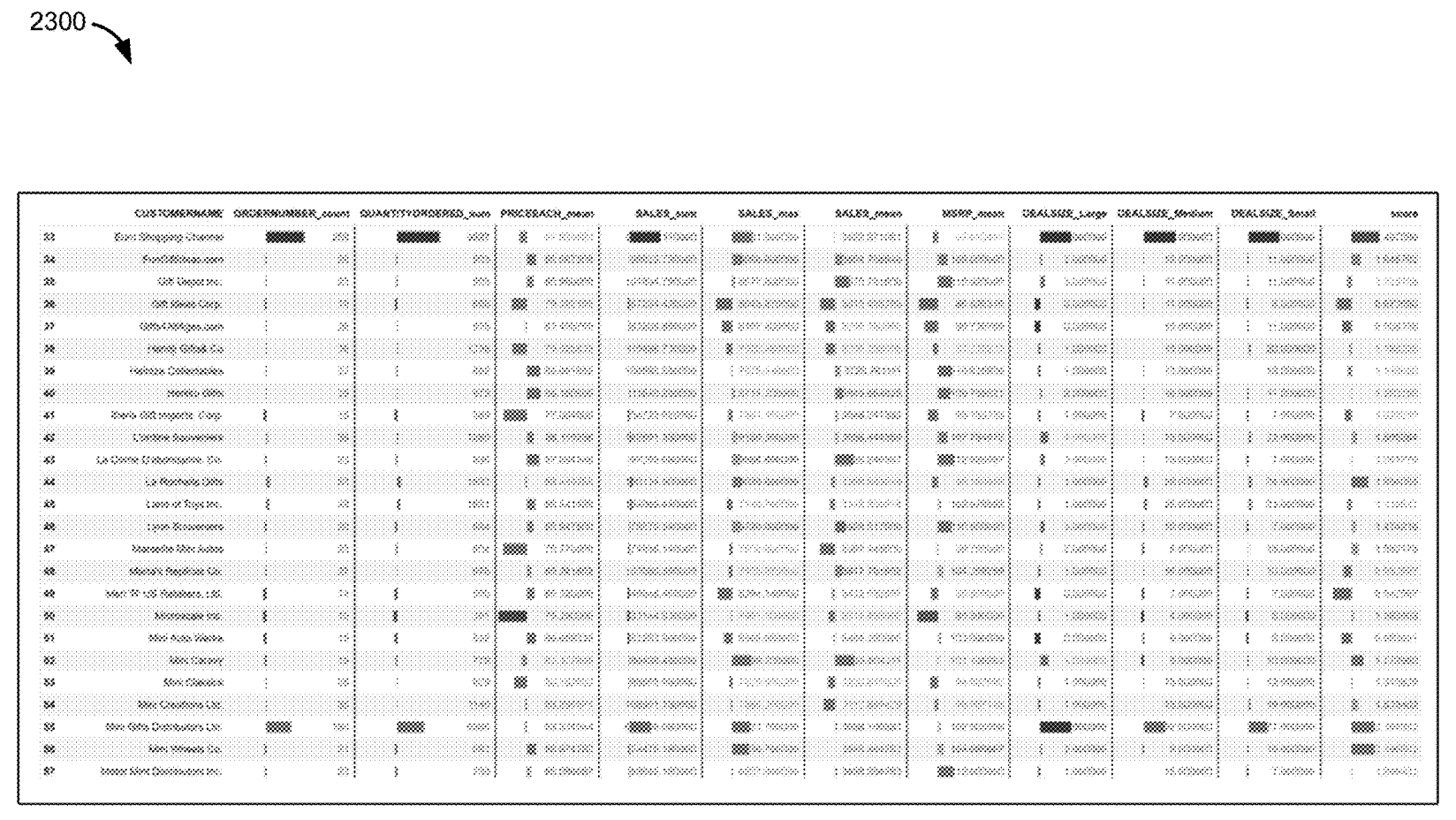

FIG. 23 shows a diagram 2300 of the data analyzer highlighter highlighting column values by deviation from average, according to an embodiment. The sales data is used in this use case. The "Distance to Avg" button is activated with "Show bar" checked in the Data Analyzer Highlighter Panel. The output is shown in diagram 2300.

Some useful information that the end user can efficiently get is listed below:

The same conclusion as in use case 1 that the ORDERNUMBER count, QUANTITYORDERED_sum, SALES_sum, DEALSIZE_Medium, DEALSIZE_Small columns have large variance but with obvious skewness.

It looks that order number is correlated with the quantity as the two columns are colored similarly.

The Medium deal size is correlated with the order number, sales amount and quantity as those columns are colored similarly.

The deal size seems not to be correlated to the score.

The No. 33 and No. 55 have large order number and quantity with large number of large deals. This could be the reason for having large sales amount and large score for these two customers.

No. 89 has exceptionally high purchase scale (high average order price with good average order amount), but it contributes low sales amount due to its inactive purchase (low ORDERNUMBER_count, QUANTITYORDERED_sum, and deal sizes). It contributes low score due to no big order (low SALES_max and relatively high SALES_mean).

No. 69 and No. 78 have similar purchase behavior as No. 89.

Use Case 3: Highlight Outliers

Figure 24:
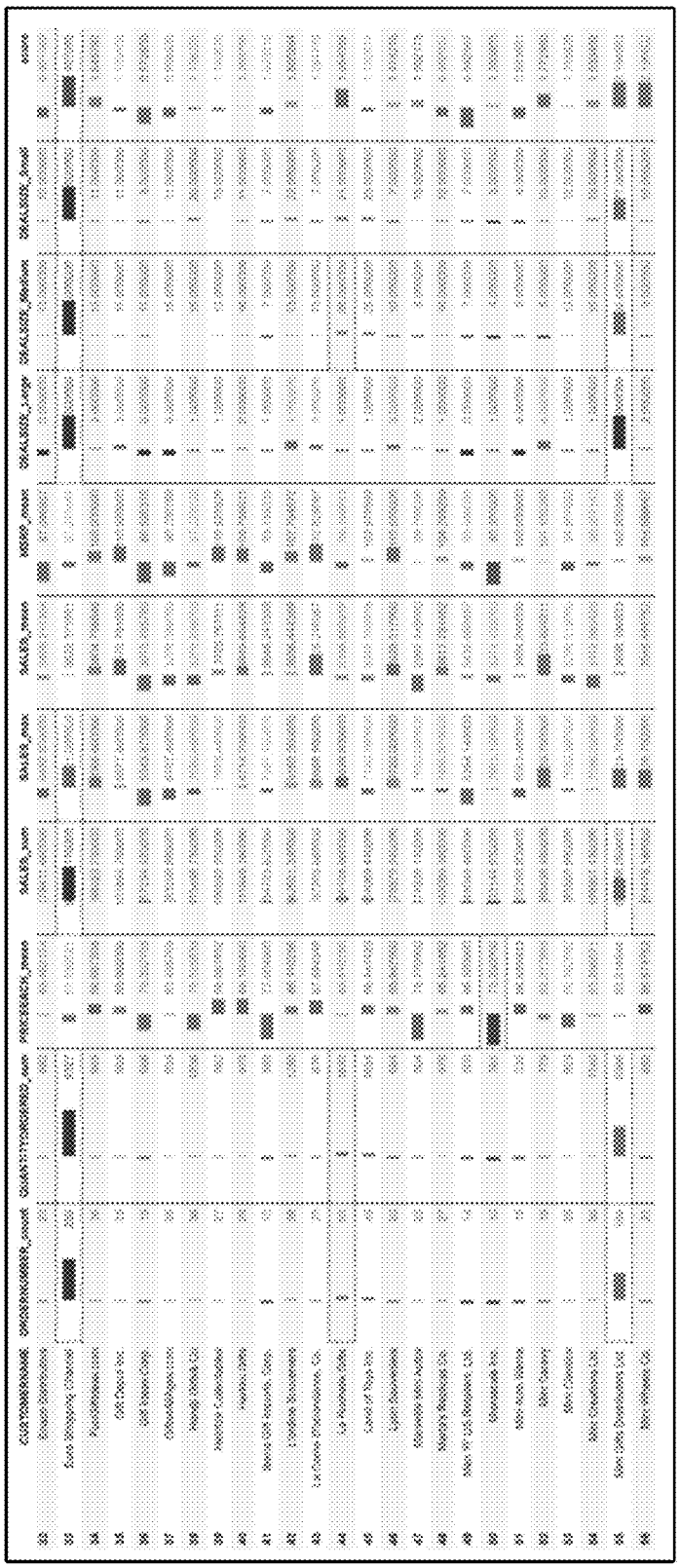
FIG. 24 shows a diagram of the data analyzer highlighter highlighting outliers, according to an embodiment.

FIG. 24 shows a diagram 2400 of the data analyzer highlighter highlighting outliers, according to an embodiment. The sales data is used in this use case. The "Col MAD Outlier" button is activated with "Show bar" checked in the Data Analyzer Highlighter Panel. Some useful information that the end user can efficiently get is listed below:

The customers, No. 33 and No. 55 are interesting for further investigation as they have many abnormal values to form special purchases.

The No. 6 has large order numbers, quantity and sales amount, and its purchase scales are stable though not large (low SALES_max and SALES_mean). This kind of customer could be for long term and should get more attention.

The No. 44 also has active purchases with large order numbers and quantity, making large sales amount. The purchase scales are stable.

The No. 58 has normal number of orders (normal ORDERNUMBER_count), but its purchases are quite large (DEALSIZE_Medium and DEALSIZE_Large) in terms of quantity (QUANTITYORDERED_sum), so its sales amount (SALES_sum) is large.

The No. 81 does not have active purchases (low ORDERNUMBER_count, QUANTITYORDERED_sum, PRICEEACH_mean) with normal sales amount, but some of its purchases are large (large DEALSIZE_Large, large SALES_max). However, its score is very high.

Use Case 4: Highlight Correlated Columns

Figure 25:
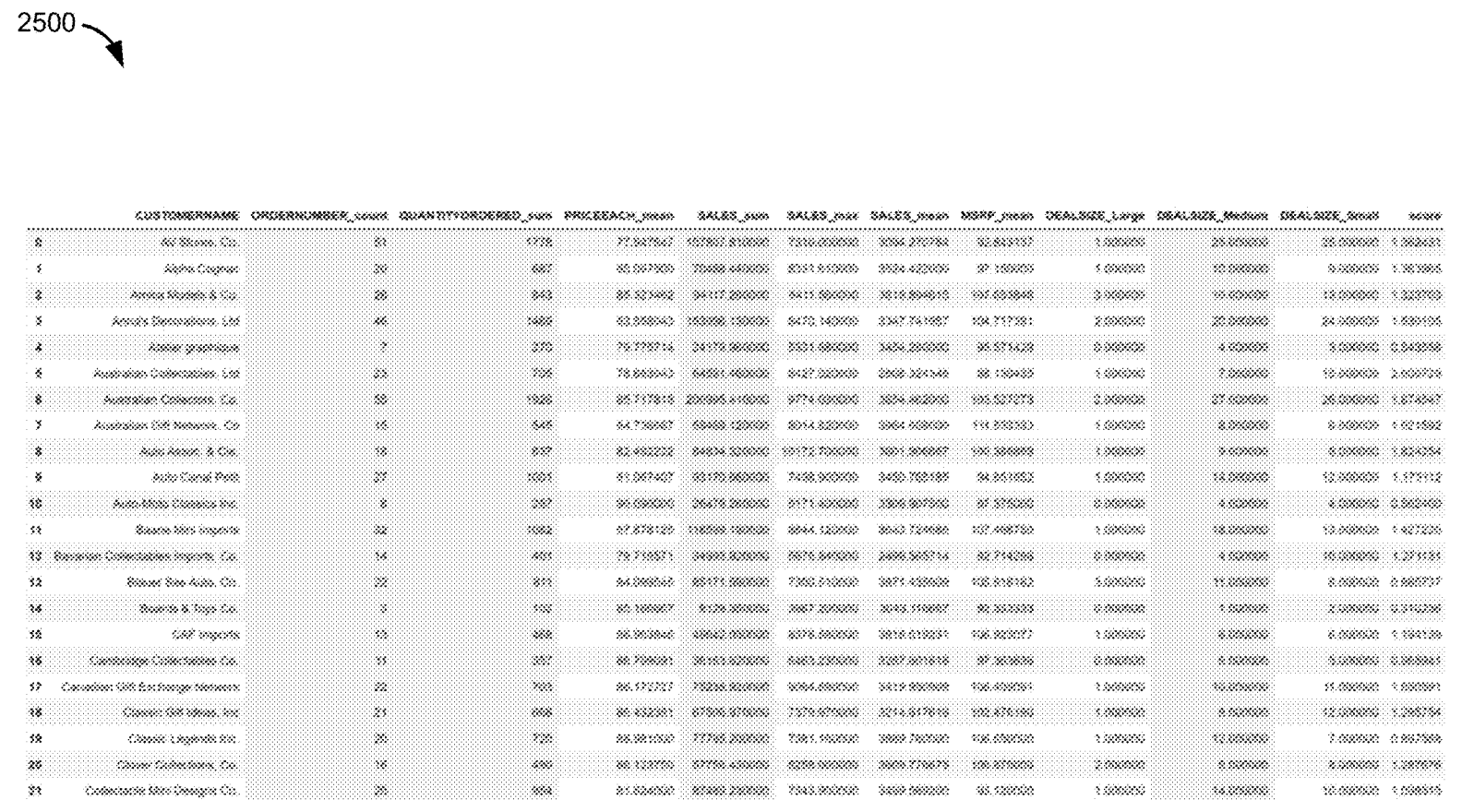

FIG. 25 shows a diagram 2500 of the data analyzer highlighter highlighting correlated columns, according to an embodiment. The sales data is used in this use case. The ORDERNUMBER_count column is selected in the "Show Column" dropbox in the Data Analyzer Highlighter Panel. The output is shown in diagram 2500.

It can be seen that the QUANTITYORDERED_sum column, the SALES_sum column and the DEALSIZE_Medium column are correlated to the selected column. This confirms the conclusion in use case 2, where the Medium deal size is correlated with the order number, sales amount and quantity as those columns are colored similarly.

Use Case 5: Make a Powerful Tool

Figure 26:
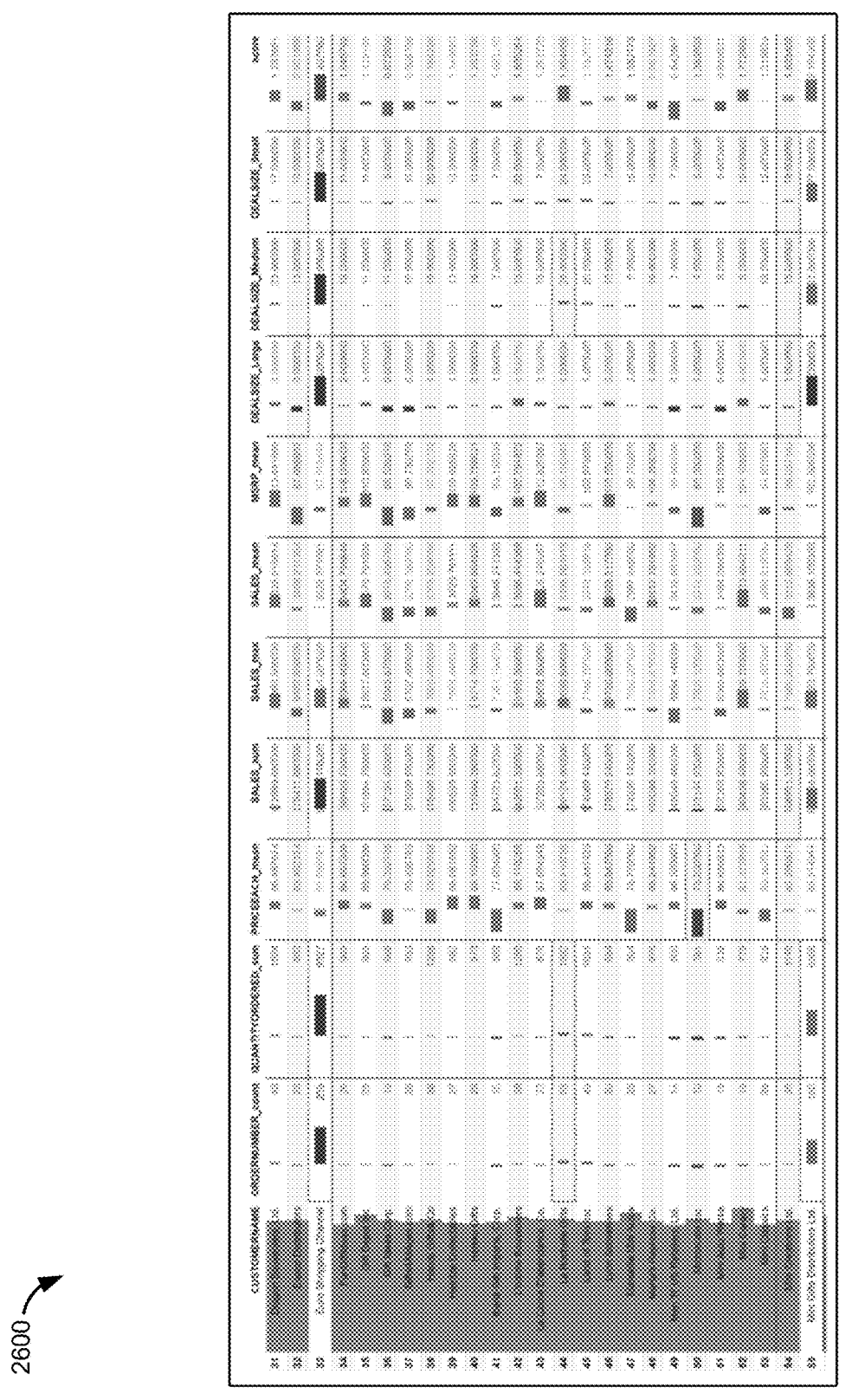

FIG. 26 shows a diagram 2600 of the data analyzer highlighter combining highlighting options, according to an embodiment. The sales data is used in this use case to show the Data Analyzer highlighter Tool can be a powerful tool by combining highlighting options. It can be seen that massive additional information can be provided to the end user when for example, the "Distance to Avg" button, the "Col MAD Outlier" button and the "Row outlier" button are activated with "Show bar" checked and the "show tooltip" checked in the Data Analyzer Highlighter Panel. The output is shown in diagram 2600.

Use Case 6: Understand the Time Series Data

Figure 27:
FIG. 27 shows a diagram of the data analyzer highlighter highlighting time series maximum values, according to an embodiment.

FIG. 27 shows a diagram 2700 of the data analyzer highlighter highlighting time series maximum values, according to an embodiment. The energy consumption dataset is used in this use case. By choosing the proper "TS Data Type" with "Show Col Min" button, "Show Col Max" button, "Show TS Min" button and "Show TS Max" button activated, some useful information that the end user can efficiently get is listed below:

By choosing the original time series data with "Show Col Min" button, "Show Col Max" button and "Show Bar" activated, it can be quickly seen that the No. 594 has the lowest energy usage in 5 months and the No. 660 has the largest energy usage across the 9 months.

By highlighting the TS max values on original data, it can be quickly seen that January is more likely to have maximal energy usage as shown in diagram 2700.

By highlighting the TS min/max values with "Time Series Change" selected, it can be quickly seen that No. 469 has continuous descent of energy usage from January but No. 886 has increased energy usage from January.

Use Case 7: Highlight Outliers in Time Series

Figure 28:
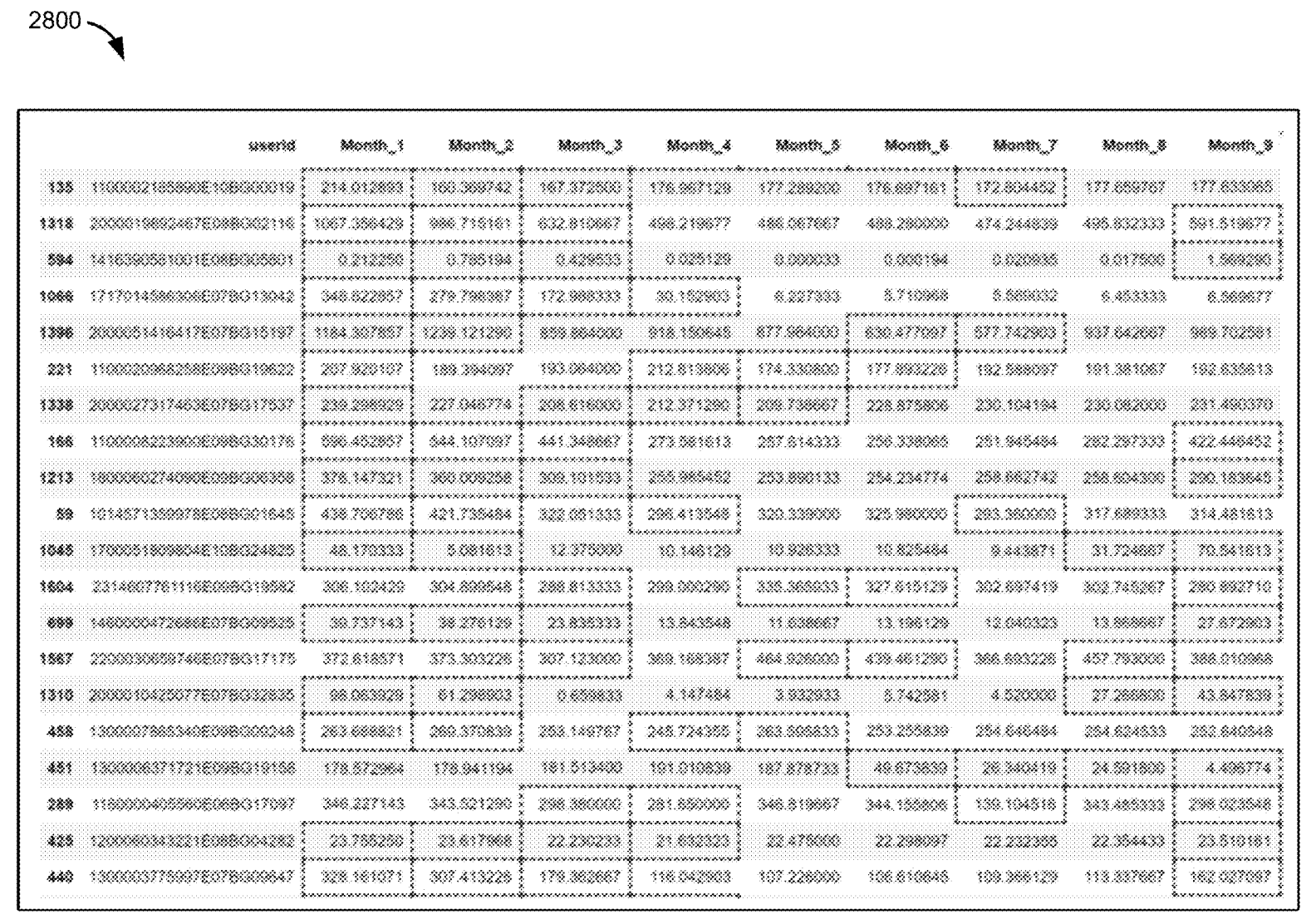

FIG. 28 shows a diagram 2800 of the data analyzer highlighter highlighting outliers in time series data, according to an embodiment The energy consumption dataset is used in this use case. It is useful to highlight the outliers in time series in terms of time series values or changes across time. This can be fulfilled by choosing the proper "TS Data Type" with the "Col MAD Outlier" button or the "TS MAD Outlier" button. This can help the end user to identify customers with uncommon energy usage or to identify anomalous part of one time series. Some useful information that the end user can efficiently get is listed below:

Based on original values, month 1, month 2 and month 3 are more likely to be outlier parts in one time series as shown in diagram 2800.

High energy usage is more likely to be outliers, which means most of customers use energy with reasonable amount.

The No. 136 has very high energy usage in month 1, 7 and 8 and its usages in other months look common. However, when observing its usage changes with the "Col MAD Outlier" button activated, this customer has anomalous usage changes in all months.

The No. 612 looks normal from original value point of view, but it shows uncommon changes in month 2 and 8.

When "Time Series Changes" is selected, the No. 114 has anomalous part in month 2 and 3 as its changes of energy usage are very uncommon, comparing to other customers.

Use Case 8: Make a Powerful Tool for Time Series Data

Figure 29:
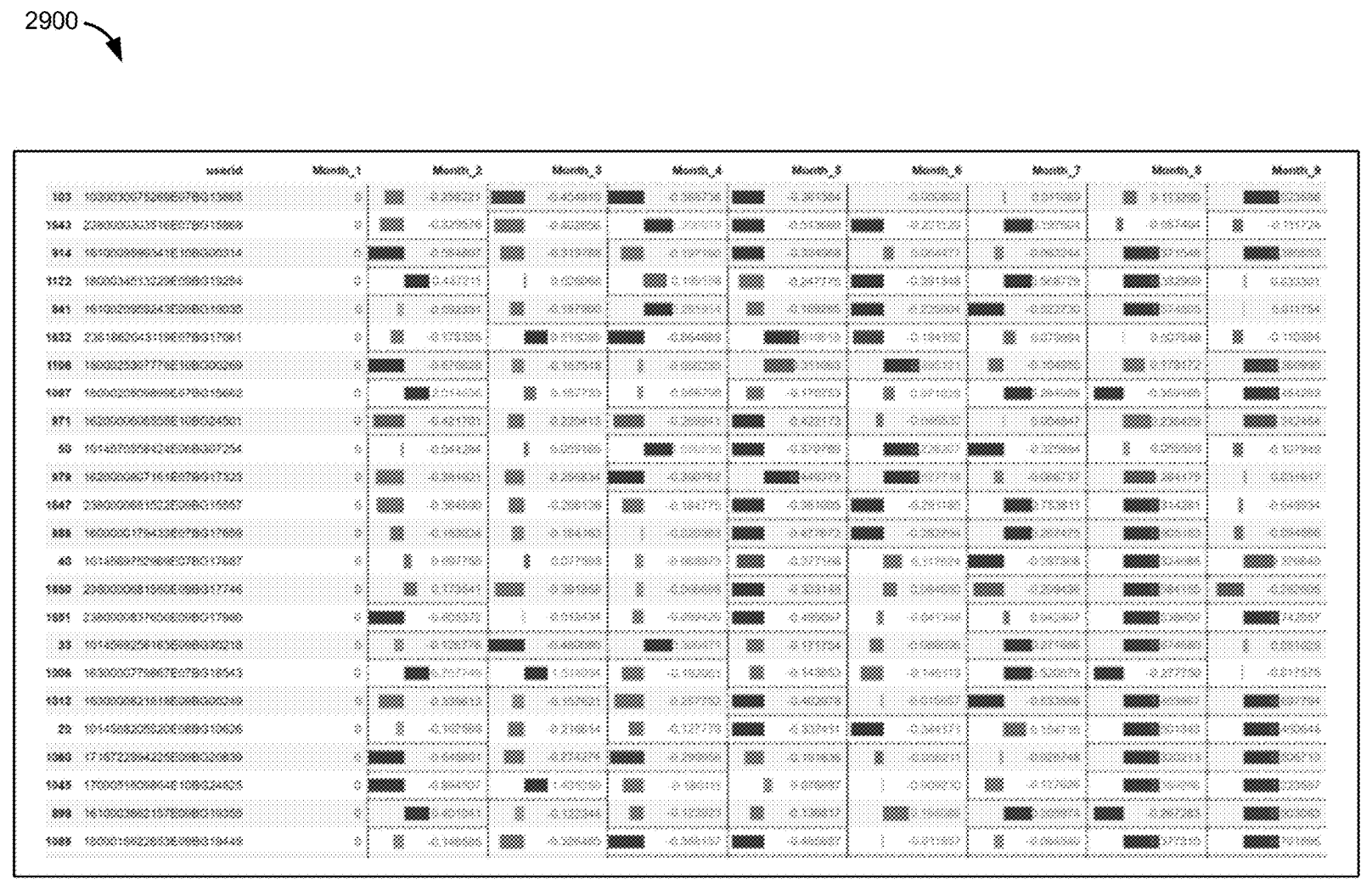

FIG. 29 shows a diagram 2900 of the data analyzer highlighter highlighting combining highlighter options for time series data, according to an embodiment. The energy consumption dataset is used to show the Data Analyzer highlighter Tool can be a powerful tool for time series data by combining highlighting options. It can be seen that massive additional information can be provided to the end user when for example, the "By Value" button and the "Col MAD Outlier" button are activated with "Show bar" checked and the "Show Outlier Rows" checked in the Data Analyzer Highlighter Panel. The output is shown in diagram 2900.

Example Hardware

Figure 30:
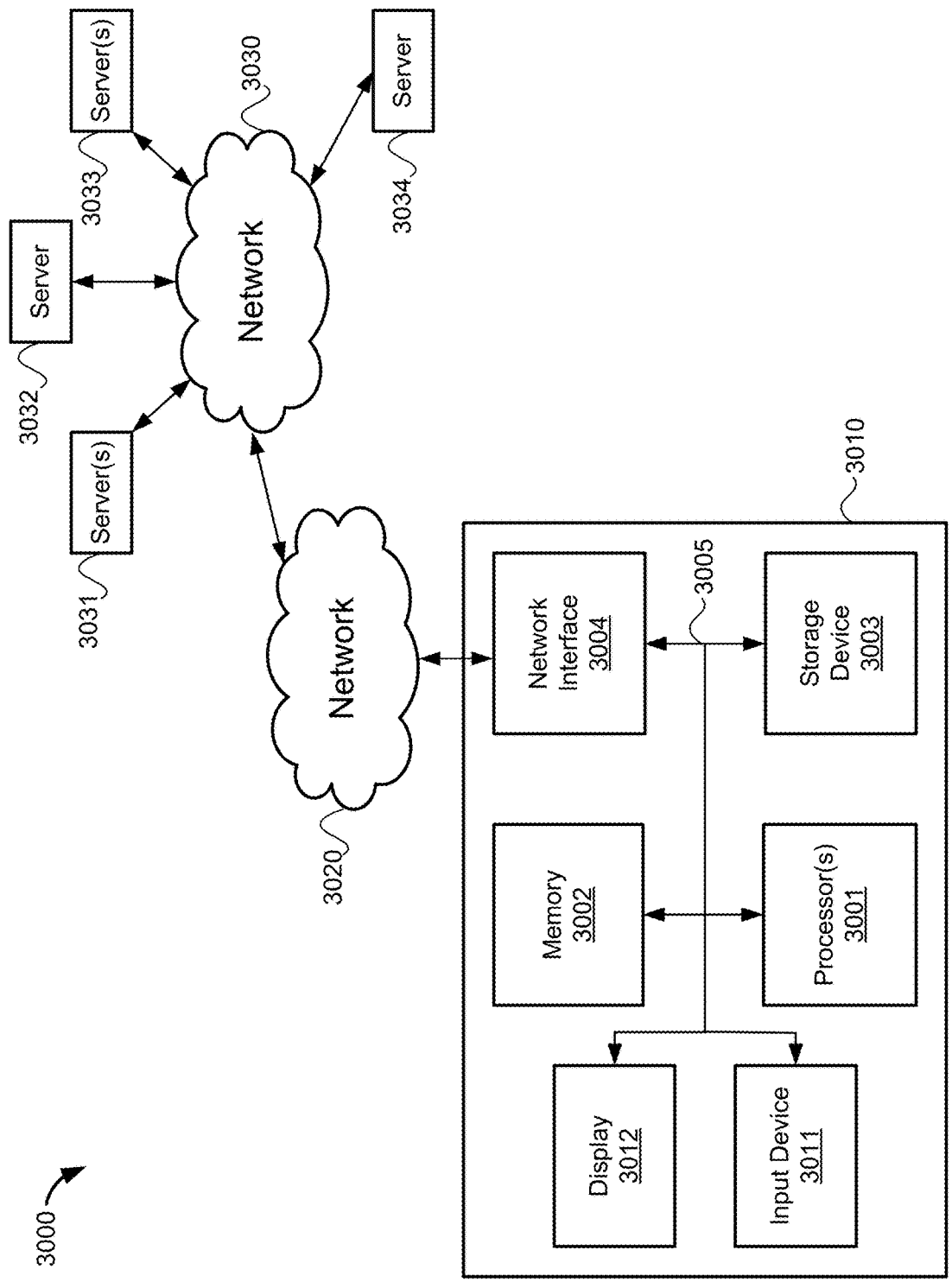
FIG. 30 shows a diagram of hardware of a special purpose computing machine for implementing systems and methods described herein.

FIG. 30 shows a diagram 3000 of hardware of a special purpose computing machine for implementing systems and methods described herein. The following hardware description is merely one example. It is to be understood that a variety of computers topologies may be used to implement the above described techniques. The hardware shown in FIG. 30 may be used to implement the computer systems and computer software (computer reprogram code) described herein.

The computer system 3010 includes a bus 3005 or other communication mechanism for communicating information, and one or more processor(s) 3001 coupled with bus 3005 for processing information. The computer system 3010 also includes a memory 3002 coupled to bus 3005 for storing information and instructions to be executed by processor 3001, including information and instructions for performing some of the techniques described above, for example. This memory may also be used for storing programs executed by processor(s) 3001. Possible implementations of this memory may be, but are not limited to, random access memory (RAM), read only memory (ROM), or both. A storage device 3003 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 3003 may include source code, binary code, or software files for performing the techniques above, for example. Storage device and memory are both examples of non-transitory computer readable storage mediums.

The computer system 3010 may be coupled via bus 3005 to a display 3012 for displaying information to a computer user. An input device 3011 such as a keyboard, touchscreen, and/or mouse is coupled to bus 3005 for communicating information and command selections from the user to processor 3001. The combination of these components allows the user to communicate with the system. In some systems, bus 3005 represents multiple specialized buses, for example.

The computer system also includes a network interface 3004 coupled with bus 3005. The network interface 3004 may provide two-way data communication between computer system 3010 and a network 3020. The network interface 3004 may be a wireless or wired connection, for example. The network 3020 may be a local area network or an intranet, for example. The computer system 3010 can send and receive information through the network interface 3004, across the network 3020, to computer systems connected to the Internet 3030. Using the Internet 3030 the computer system 3010 may access data and features that reside on multiple different hardware servers 3031-3034. The servers 3031-3034 may be part of a cloud computing environment in some embodiments.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
one or more processors;
one or more machine-readable medium coupled to the one or more processors and storing computer program code comprising sets of instructions executable by the one or more processors to:
  generate a first visualization in a user interface, the first visualization of a first table comprising rows and columns of data of a dataset;
  generate a configuration panel in the user interface, the configuration panel including graphical user interface controls including a plurality of buttons, dropdown boxes, and checkboxes configured for selecting:
    one or more statistical techniques from a predefined set of statistical techniques comprising at least one of minimum value detection, maximum value detection, and outlier detection; and
    sorting options including sorting by variance, sorting by distribution, or sorting by information;
  obtain selections via the configuration panel of the user interface of the one or more statistical techniques and sorting options;
  determine statistics from the dataset using each of the one or more selected statistical techniques;
  sort the rows of data or the columns of data based on a number of extreme values in a particular row or column, wherein an extreme value is a minimum value, a maximum value, or an outlier value as determined by the statistics; and
  generate a second visualization in the user interface, the second visualization of a second table comprising rows and columns of data of the dataset sorted based on the number of extreme values in the particular row or column, wherein cells of the second table are highlighted in colors based on a probability value that indicates a probability of a particular cell value given all values in a corresponding column of the second table, wherein low probability values indicate a rare value and high probability values indicate a common value.

2. The computer system of claim 1, wherein the dataset comprises time series data and wherein the determining of statistics from the dataset includes determining statistics between the columns of data.

3. The computer system of claim 2, wherein the determination of statistics from the dataset includes determining anomalous values in the time series data, and wherein the determined anomalous values are identified by highlighting in the second visualization of the second table.

4. The computer system of claim 1, wherein the one or more statistical techniques include one or more of a probability, a distance to average, a distance to median, a minimal value within a column, a maximal value within a column, an interquartile range, a median absolute deviation, and an outlier within a row.

5. The computer system of claim 1, wherein the computer program code further comprises sets of instructions executable by the one or more processors to:
  generate bars within the cells of the table corresponding to the particular cell value.

6. A non-transitory computer-readable medium storing computer program code comprising sets of instructions to:
  generate a first visualization in a user interface, the first visualization of a first table comprising rows and columns of data of a dataset;
  generate a configuration panel in the user interface, the configuration panel including graphical user interface controls including a plurality of buttons, dropdown boxes, and checkboxes configured for selecting:
    one or more statistical techniques from a predefined set of statistical techniques comprising at least one of minimum value detection, maximum value detection, and outlier detection; and
    sorting options including sorting by variance, sorting by distribution, or sorting by information;
  obtain selections via the configuration panel of the user interface of one or more statistical techniques and sorting options;
  determine statistics from the dataset using each of the one or more selected statistical techniques;
  sort the rows of data or the columns of data based on a number of extreme values in a particular row or column, wherein an extreme value is a minimum value, a maximum value, or an outlier value as determined by the statistics; and
  generate a second visualization in the user interface, the second visualization of a second table comprising rows and columns of data of the dataset sorted based on the number of extreme values in the particular row or column, wherein cells of the second table are highlighted in colors based on a probability value that indicates a probability of a particular cell value given all values in a corresponding column of the second table, wherein low probability values indicate a rare value and high probability values indicate a common value.

7. The non-transitory computer-readable medium of claim 6, wherein the dataset comprises time series data and wherein the determining of statistics from the dataset includes determining statistics between the columns of data.

8. The non-transitory computer-readable medium of claim 7, wherein the determination of statistics from the dataset includes determining anomalous values in the time series data, and wherein the determined anomalous values are identified by highlighting in the second visualization of the second table.

9. The non-transitory computer-readable medium of claim 6, wherein the one or more statistical techniques include one or more of a probability, a distance to average, a distance to median, a minimal value within a column, a maximal value within a column, an interquartile range, a median absolute deviation, and an outlier within a row.

10. The non-transitory computer-readable medium of claim 6, wherein the computer program code further comprises sets of instructions to:
  generate bars within the cells of the table corresponding to within the particular cell value.

11. A computer-implemented method performed by one or more processors, the method comprising:

generating a first visualization in a user interface, the first visualization of a first table comprising rows and columns of data of a dataset;

generating a configuration panel in the user interface, the configuration panel including graphical user interface controls including a plurality of buttons, dropdown boxes, and checkboxes configured for selecting:

one or more statistical techniques from a predefined set of statistical techniques comprising at least one of minimum value detection, maximum value detection, and outlier detection; and sorting options including sorting by variance, sorting by distribution, or sorting by information;

obtaining selections via the configuration panel of the user interface of one or more statistical techniques and sorting options;

determining statistics from the dataset using each of the one or more selected statistical techniques;

sorting the rows of data or the columns of data based on a number of extreme values in a particular row or column, wherein an extreme value is a minimum value, a maximum value, or an outlier value as determined by the statistics; and generating a second visualization in the user interface, the second visualization of a second table comprising rows and columns of data of the dataset sorted based on the number of extreme values in the particular row or column, wherein cells of the second table are highlighted in colors based on a probability value that indicates a probability of a particular cell value given all values in a corresponding column of the second table, wherein low probability values indicate a rare value and high probability values indicate a common value.

12. The computer-implemented method of claim 11, wherein the dataset comprises time series data and wherein the determining of statistics from the dataset includes determining statistics between the columns of data.

13. The computer-implemented method of claim 12, wherein the determination of statistics from the dataset includes determining anomalous values in the time series data, and wherein the determined anomalous values are identified by highlighting in the second visualization of the second table.

14. The computer-implemented method of claim 11, wherein the one or more statistical techniques include one or more of a probability, a distance to average, a distance to median, a minimal value within a column, a maximal value within a column, an interquartile range, a median absolute deviation, and an outlier within a row.

15. The computer-implemented method of claim 11, further comprising:

generate bars within the cells of the table corresponding to the particular cell value.

* * * * *